(12) United States Patent
Pribble et al.

(10) Patent No.: US 11,908,183 B2
(45) Date of Patent: Feb. 20, 2024

(54) IMAGE ANALYSIS AND PROCESSING PIPELINE WITH REAL-TIME FEEDBACK AND AUTOCAPTURE CAPABILITIES, AND VISUALIZATION AND CONFIGURATION SYSTEM

(71) Applicant: Capital One Services, LLC, McLean, VA (US)

(72) Inventors: Jason Pribble, McLean, VA (US); Daniel Alan Jarvis, Vienna, VA (US); Nicholas Capurso, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 67 days.

(21) Appl. No.: 17/805,567

(22) Filed: Jun. 6, 2022

(65) Prior Publication Data

US 2022/0375215 A1 Nov. 24, 2022

Related U.S. Application Data

(63) Continuation of application No. 16/948,043, filed on Aug. 28, 2020, now Pat. No. 11,354,889, which is a
(Continued)

(51) Int. Cl.
*G06V 10/98* (2022.01)
*G06T 7/12* (2017.01)
(Continued)

(52) U.S. Cl.
CPC .............. *G06V 10/993* (2022.01); *G06T 7/12* (2017.01); *G06V 10/141* (2022.01);
(Continued)

(58) Field of Classification Search
CPC . G06T 2207/10016; G06T 2207/20016; G06T 2207/20104; G06T 2207/20132;
(Continued)

(56) References Cited

U.S. PATENT DOCUMENTS 6,360,026 B1 3/2002 Kulkarni et al.
6,430,320 B1 8/2002 Jia et al.
(Continued)

FOREIGN PATENT DOCUMENTS

CN 106228168 A 12/2016

*Primary Examiner* — Manuchehr Rahmjoo
(74) *Attorney, Agent, or Firm* — Harrity & Harrity, LLP

(57) ABSTRACT

A device may capture a plurality of preview frames of a document, and for each preview frame of the plurality of preview frames, process the preview frame to identify an object in the preview frame. Processing the preview frame may include converting the preview frame into a grayscale image, generating a blurred image based on the grayscale image, detecting a plurality of edges in the blurred image, defining at least one bounding rectangle based on the plurality of edges, and determining an outline of the object based on the at least one bounding rectangle. The device may determine whether a value of an image parameter, associated with the one or more preview frames, satisfies a threshold, and provide feedback to a user of the device, or automatically capture an image of the document, based on determining whether the value of the image parameter satisfies the threshold.

20 Claims, 20 Drawing Sheets

Related U.S. Application Data continuation of application No. 16/169,807, filed on Oct. 24, 2018, now Pat. No. 10,762,369, which is a continuation of application No. 15/998,989, filed on Aug. 20, 2018, now Pat. No. 10,262,220.

(51) Int. Cl.
| | |
|---|---|
| *G06V 10/30* | (2022.01) |
| *G06V 10/141* | (2022.01) |
| *G06V 10/24* | (2022.01) |
| *G06V 10/20* | (2022.01) |
| *G06V 10/44* | (2022.01) |
| *G06V 30/414* | (2022.01) |

(52) U.S. Cl.
CPC .......... *G06V 10/242* (2022.01); *G06V 10/255* (2022.01); *G06V 10/30* (2022.01); *G06V 10/443* (2022.01); *G06V 30/414* (2022.01)

(58) Field of Classification Search
CPC ......... G06T 2207/30168; G06T 7/0002; G06T 7/12; G06V 10/141; G06V 10/242; G06V 10/255; G06V 10/30; G06V 10/443; G06V 10/993; G06V 30/414
See application file for complete search history.

(56) References Cited

U.S. PATENT DOCUMENTS

| | | |
|---|---|---|
| 6,956,587 B1 | 10/2005 | Anson et al. |
| 8,855,375 B2 | 10/2014 | Macciola et al. |
| 9,208,550 B2 * | 12/2015 | Chen ...................... G06V 30/40 |
| 9,672,510 B2 | 6/2017 | Roach et al. |
| 10,262,220 B1 | 4/2019 | Pribble |
| 10,460,191 B1 | 10/2019 | Pribble |
| 10,691,966 B2 | 6/2020 | Pribble |
| 10,762,369 B2 | 9/2020 | Pribble |
| 11,354,889 B2 | 6/2022 | Pribble et al. |
| 2011/0285874 A1 | 11/2011 | Showering et al. |

* cited by examiner

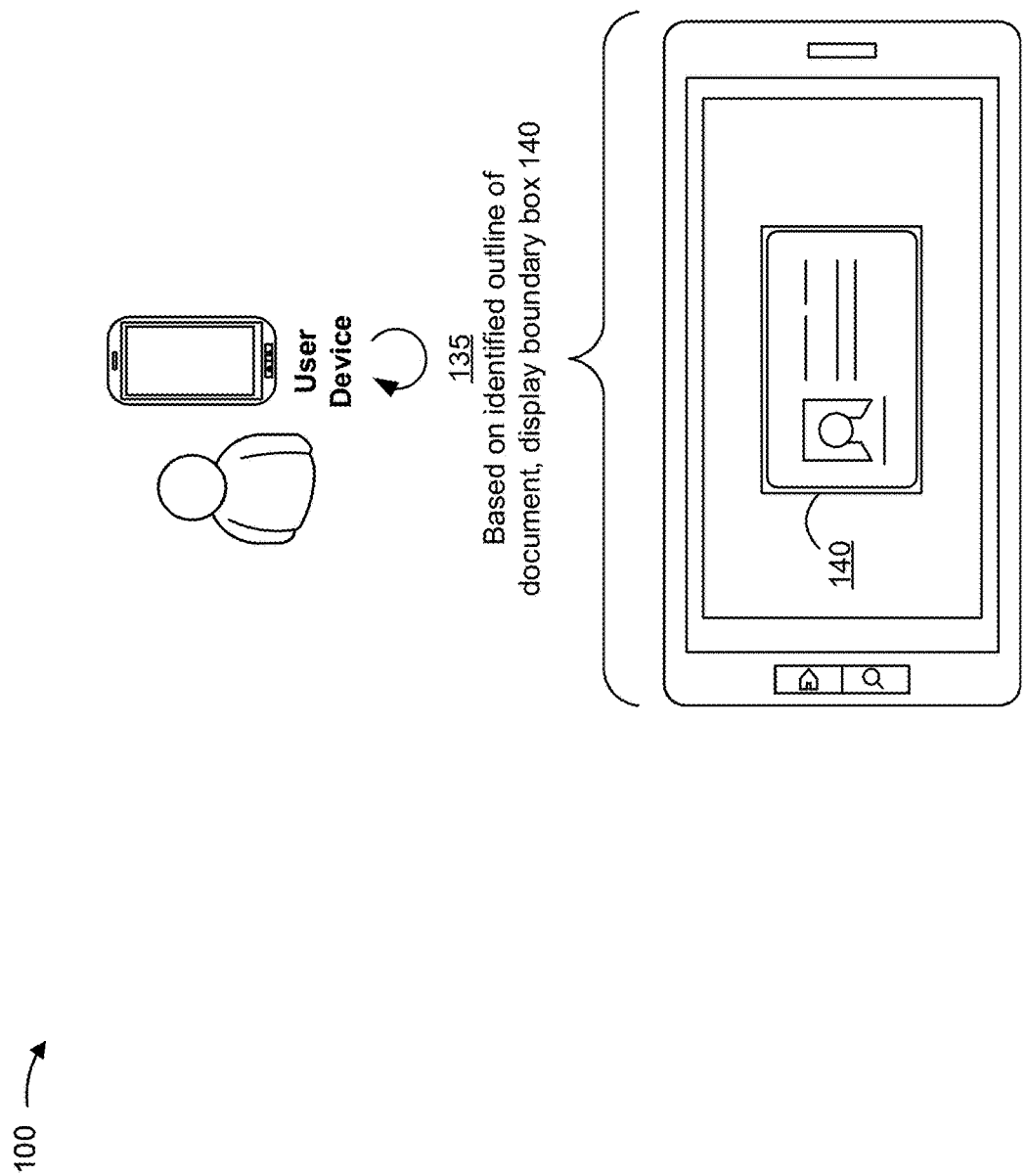

IMAGE ANALYSIS AND PROCESSING PIPELINE WITH REAL-TIME FEEDBACK AND AUTOCAPTURE CAPABILITIES, AND VISUALIZATION AND CONFIGURATION SYSTEM

RELATED APPLICATIONS

This application is a continuation of U.S. patent application Ser. No. 16/948,043, filed Aug. 28, 2020 (now U.S. Pat. No. 11,354,889), which is a continuation of U.S. patent application Ser. No. 16/169,807, filed Oct. 24, 2018 (now U.S. Pat. No. 10,762,369), which is a continuation of U.S. patent application Ser. No. 15/998,989, filed Aug. 20, 2018 (now U.S. Pat. No. 10,262,220), the contents of which are incorporated herein by reference in their entirety.

BACKGROUND

Image processing (e.g., digital image processing) involves the use of computer algorithms to perform processing operations on digital image data.

SUMMARY

According to some possible implementations, a method may include capturing, by a device, a plurality of preview images of a document, and for each preview image of the plurality of preview images, processing, by the device in substantially real-time, the preview image to identify an object, in the preview image, that corresponds to the document. The processing may include converting the preview image into a grayscale image, generating a blurred image based on the grayscale image, detecting a plurality of edges in the blurred image, identifying a plurality of shapes based on the plurality of edges, defining a plurality of bounding rectangles for the plurality of shapes, and determining an outline of the object based on the plurality of bounding rectangles. The method may include determining, by the device and based on determining the outline of the object in one or more preview images of the plurality of preview images, whether a value of an image parameter, associated with the one or more preview images, satisfies a threshold, and providing, by the device in substantially real-time, feedback to a user of the device, based on determining that the value of the image parameter does not satisfy the threshold. The feedback may include an instruction to the user to perform an action with respect to the device and/or to the document. The method may include automatically capturing, by the device, an image of the document based on determining that the value of the image parameter satisfies the threshold.

According to some possible implementations, a device may include one or more memories and one or more processors, communicatively coupled to the one or more memories, configured to capture a plurality of preview frames of a document, and for each preview frame of the plurality of preview frames, process, in substantially real-time, the preview frame to identify an object in the preview frame. When processing the preview frame, the one or more processors may be configured to convert the preview frame into a grayscale image, generate a blurred image based on the grayscale image, detect a plurality of edges in the blurred image, define at least one bounding rectangle based on the plurality of edges, and determine an outline of the object based on the at least one bounding rectangle. The one or more processors may be configured to determine, based on determining the outline of the object in one or more preview frames of the plurality of preview frames, whether a value of an image parameter, associated with the one or more preview frames, satisfies a threshold, and provide feedback to a user of the device, or automatically capture an image of the document, based on determining whether the value of the image parameter satisfies the threshold.

According to some possible implementations, a non-transitory computer-readable medium may store instructions. The instructions may include one or more instructions that, when executed by one or more processors of a device, cause the one or more processors to obtain a plurality of preview images of a document, and for each preview image of the plurality of preview images, process, in substantially real-time, the preview image to identify an object in the preview image. The one or more instructions, that cause the one or more processors to process the preview image, may cause the one or more processors to convert the preview image into a grayscale image, generate a blurred image based on the grayscale image, detect a plurality of edges in the blurred image, define at least one bounding rectangle based on the plurality of edges, and determine an outline of the object based on the at least one bounding rectangle. The one or more instructions, when executed by the one or more processors, cause the one or more processors to determine, based on determining the outline of the object in one or more preview images of the plurality of preview images, that a value of an image parameter, associated with the one or more preview images, satisfies a threshold, and automatically capture an image of the document based on determining that the value of the image parameter satisfies the threshold.

According to some possible implementations, a method may include receiving, by a device in substantially real-time, information relating to an image analysis and processing pipeline. The image analysis and processing pipeline may be configured to process preview images, captured by the device, to identify and/or track an object of interest in the preview images. The image analysis and processing pipeline may include a plurality of stages. The information may include data regarding a plurality of output values provided by the image analysis and processing pipeline, and data regarding processed images associated with one or more stages of the plurality of stages. The method may include presenting, by the device in substantially real-time, for display, the plurality of output values, the processed images, and at least one option for tuning at least one configuration parameter of the image analysis and processing pipeline. The method may include causing, by the device in substantially real-time, the at least one configuration parameter to be adjusted based on a selection of the at least one option.

According to some possible implementations, a device may include one or more memories, and one or more processors, communicatively coupled to the one or more memories, configured to receive, in substantially real-time, information relating to an image analysis and processing pipeline. The image analysis and processing pipeline may be configured to process preview frames, captured by the device, to identify an object of interest in the preview frames. The image analysis and processing pipeline may include a plurality of stages. The information may include data regarding results of calculations performed by the image analysis and processing pipeline, and data regarding processed frames associated with one or more stages of the plurality of stages. The one or more processors may be configured to present, in substantially real-time, for display, the results of the calculations, the processed frames, and at least one option for adjusting at least one configuration parameter of the image analysis and processing pipeline. The one or more processors may be configured to cause, in substantially real-time, the at least one configuration parameter to be modified based on a selection of the at least one option.

According to some possible implementations, a non-transitory computer-readable medium may store instructions. The instructions may include one or more instructions that, when executed by one or more processors of a device, cause the one or more processors to receive information relating to an image analysis and processing pipeline. The image analysis and processing pipeline may be configured to process preview images to identify and/or track an object of interest in the preview images. The image analysis and processing pipeline may include a plurality of stages. The information may include data regarding a plurality of output values provided by the image analysis and processing pipeline, and data regarding processed images associated with one or more stages of the plurality of stages. The one or more instructions, when executed by the one or more processors, may cause the one or more processors to present, for display, the plurality of output values, the processed images, and a plurality of options for adjusting a plurality of configuration parameters of the image analysis and processing pipeline. The one or more instructions, when executed by the one or more processors, may cause the one or more processors to cause the plurality of configuration parameters to be adjusted, in substantially real-time, based on selections of the plurality of options.

BRIEF DESCRIPTION OF THE DRAWINGS

FIGS. 1A-1L are diagrams of an example implementation described herein.

DETAILED DESCRIPTION

Figure 1A:
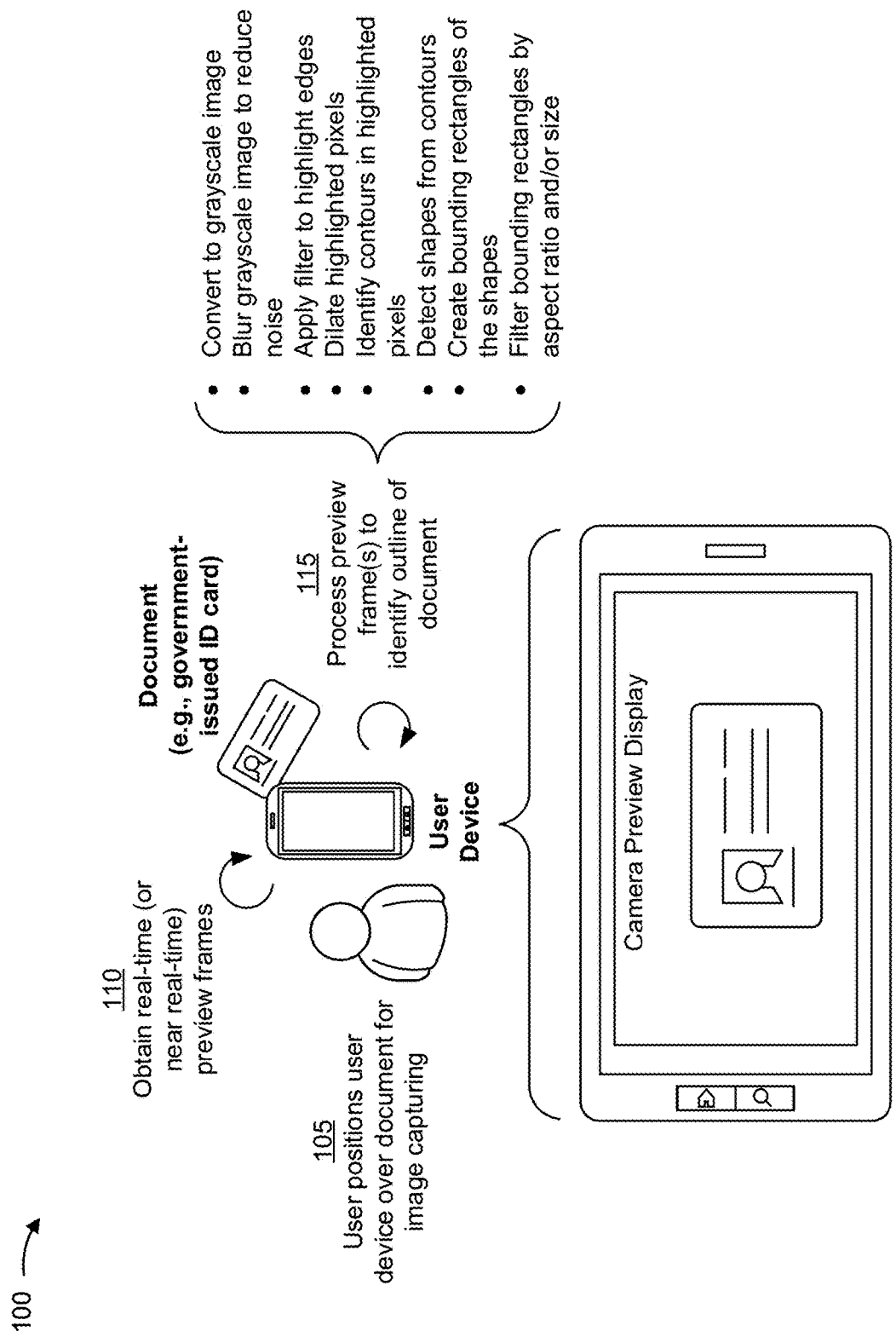

The following detailed description of example implementations refers to the accompanying drawings. The same reference numbers in different drawings may identify the same or similar elements.

Some entities (e.g., financial institutions, such as banks and/or the like) permit account applicants, or customers, to capture images of verification documentation (e.g., government-issued identification (ID) cards and/or the like) using a mobile device (e.g., a smartphone), and submit the images over the Internet for validation. However, this can often be a frustrating process for a user, particularly if an entity's backend platform repeatedly rejects uploaded images for not meeting certain image quality standards. Furthermore, in cases where captured images are processed by an application on the mobile device, existing techniques for debugging and testing the application are inefficient and time-consuming. For example, debug information may need to be printed to logs, and any changes to processing parameters may require recompiling and redeployment of the application. In addition, a separate device is also typically needed to view the debug information and make changes to the processing parameters.

Some implementations, described herein, provide a device that is capable of implementing a real-time (or near real-time) image analysis and processing pipeline that facilitates capturing of high-resolution images of documents (e.g., ID cards, passports, personal checks, bank checks, and/or the like). In some implementations, the image analysis and processing pipeline may include various stages of image processing, including stages where preview frames or images, captured by the device, are converted into grayscale images, where the grayscale images are processed (e.g., blurred, subjected to edge detection and pixel dilation, and/or the like) to identify and/or track an object (e.g., corresponding to a document) in the preview frames, where various image parameters (e.g., relating to contrast, glare, distance, focus, and/or the like) are calculated and outputted, and where determinations are made, based on comparisons of calculated image parameter values and corresponding thresholds, as to whether to provide real-time (or near real-time) feedback to a user of the device (e.g., to address issues with the image parameter(s)) or to trigger the device to automatically capture (autocapture) a high-resolution image of a document. In some implementations, the device may be capable of analyzing an automatically-captured high-resolution image, performing similar calculations of image parameter values and comparisons of such image parameter values and corresponding thresholds, and cropping an object identified in the high-resolution image, or rejecting the high-resolution image, depending on whether such thresholds are satisfied.

In this way, the image analysis and processing pipeline may guide a user in the image capturing process via real-time (or near real-time) feedback, and ensure that only high-quality images of a document are ultimately captured (and, for example, uploaded to a backend platform for validation). This shortens, and simplifies, the image capturing process, which conserves computing resources, power resources, and memory resources of the device that would otherwise need to be expended in cases where low-quality images are repeatedly captured. In addition, this conserves computing resources, memory resources, and network resources, associated with a backend platform, that would otherwise need to be expended to receive and process low-quality images that may ultimately be rejected.

Furthermore, some implementations, described herein, provide a visualization and configuration system (e.g., a visual debug tool) capable of displaying debug information for a real-time (or near real-time) image analysis and processing pipeline. In some implementations, the visualization and configuration system may be implemented in a user device on which the image analysis and processing pipeline is executing, and may permit a user (e.g., a developer of the image analysis and processing pipeline and/or the like) to tune or adjust configuration parameters of the image analysis and processing pipeline (e.g., relating to blurring operations, edge detection operations, pixel dilation operations, and/or the like), and observe adjusted outputs of the image analysis and processing pipeline in real-time (or near real-time).

In this way, the performance of an image analysis and processing pipeline may be efficiently tested in isolation, and in a variety of user devices and test environments. Inefficiencies in the image analysis and processing pipeline may be identified and corrected, and optimal configuration parameters may also be determined. In addition, permitting a user to observe the progression of image processing, at various stages of the image analysis and processing pipeline, is particularly beneficial, since small adjustments to the configuration parameters, at a given stage, may have a large impact on an end result. For example, a user may, based on observations gained from the visualization and configuration system, develop automated test(s) for continuously validating the image analysis and processing pipeline (e.g., by adjusting inputs and observing corresponding outputs of the image analysis and processing pipeline). This simplifies the development process, and conserves computing resources and power resources that would otherwise need to be expended as part of typical debug sessions. Moreover, implementing the visualization and configuration system in the same device, on which the image analysis and processing pipeline is executing, also enables a user to freely test the image analysis and processing pipeline, without a need to connect the user device to an external computing device (as may otherwise be needed for debug purposes), which also simplifies the development process, and conserves computing resources and power resources.

FIGS. 1A-1L are diagrams of an example implementation 100 described herein. Example implementation 100 may include a user device (e.g., a mobile device, such as a smartphone and/or the like) and a document (e.g., a government-issued identification (ID) card, an employee identification card, a health insurance card, a transaction card (e.g., a credit card, a debit card, an automated teller machine (ATM) card, and/or the like), a check, and/or the like). In some implementations, the user device may include a camera (e.g., one or more cameras) configured to capture images, and one or more applications (e.g., provided by, or associated with, an entity, such as a financial institution (e.g., a bank and/or the like)), implemented as an image analysis and processing pipeline (or algorithm), capable of facilitating image capturing.

As shown in FIG. 1A, and as shown by reference number 105, a user may position the user device over the document for image capturing. In some implementations, the user device may include a user interface configured to display a live preview image of the document being captured. As shown by reference number 110, the user device (e.g., based on programmed instructions associated with the image analysis and processing pipeline, based on an input from the user, and/or the like) may obtain real-time (or near real-time) preview frames from the camera. For example, the camera may be configured to generate preview frames in one or more formats (e.g., NV21, YUV 4:2:0, red-green-blue (RGB) bitmap, and/or the like). In some implementations, the camera may provide preview frames at a particular rate or quantity of preview frames per second (e.g., at about 30 frames per second and/or the like).

As shown by reference number 115, the user device (e.g., the image analysis and processing pipeline) may process each preview frame (e.g., in real-time (or near real-time)) to identify an outline (e.g., an ID rectangle) of an object, in the preview frame, that corresponds to the document. As shown, processing a preview frame may involve multiple operations. In some implementations, the user device may convert the preview frame into a grayscale image by normalizing the preview frame to a grayscale byte array. For example, the user device may convert the preview frame to a byte array, such as by discarding color channel data in the preview frame, and retaining luminance channel data. In some implementations, the user device may blur the grayscale image to reduce noise and facilitate edge detection. In some implementations, the user device may apply a filter to highlight edges in the blurred grayscale image, dilate highlighted pixels (e.g., to fill in potential gaps between lines), and identify contours in the highlighted pixels. In some implementations, the user device may detect shapes from the contours, define bounding rectangles of the shapes, and perform a filtering process on the bounding rectangles to identify a bounding rectangle that has an aspect ratio and/or a size that corresponds to an aspect ratio and/or a size of a particular document or a particular type of document (e.g., a government-issued ID card and/or the like). Based on identifying the bounding rectangle, the user device may determine an outline of an object, in the preview frame, that corresponds to the document. Additional details of these processing operations are described below in connection with FIGS. 1G-1K.

In some implementations, the image analysis and processing pipeline may include one or more stages in which values of various image parameters (e.g., relating contrast, glare, distance, and/or the like) are calculated and compared with corresponding thresholds, and determinations are made as to whether real-time (or near real-time) feedback, regarding image quality issues, is to be provided to a user.

Figure 1B:
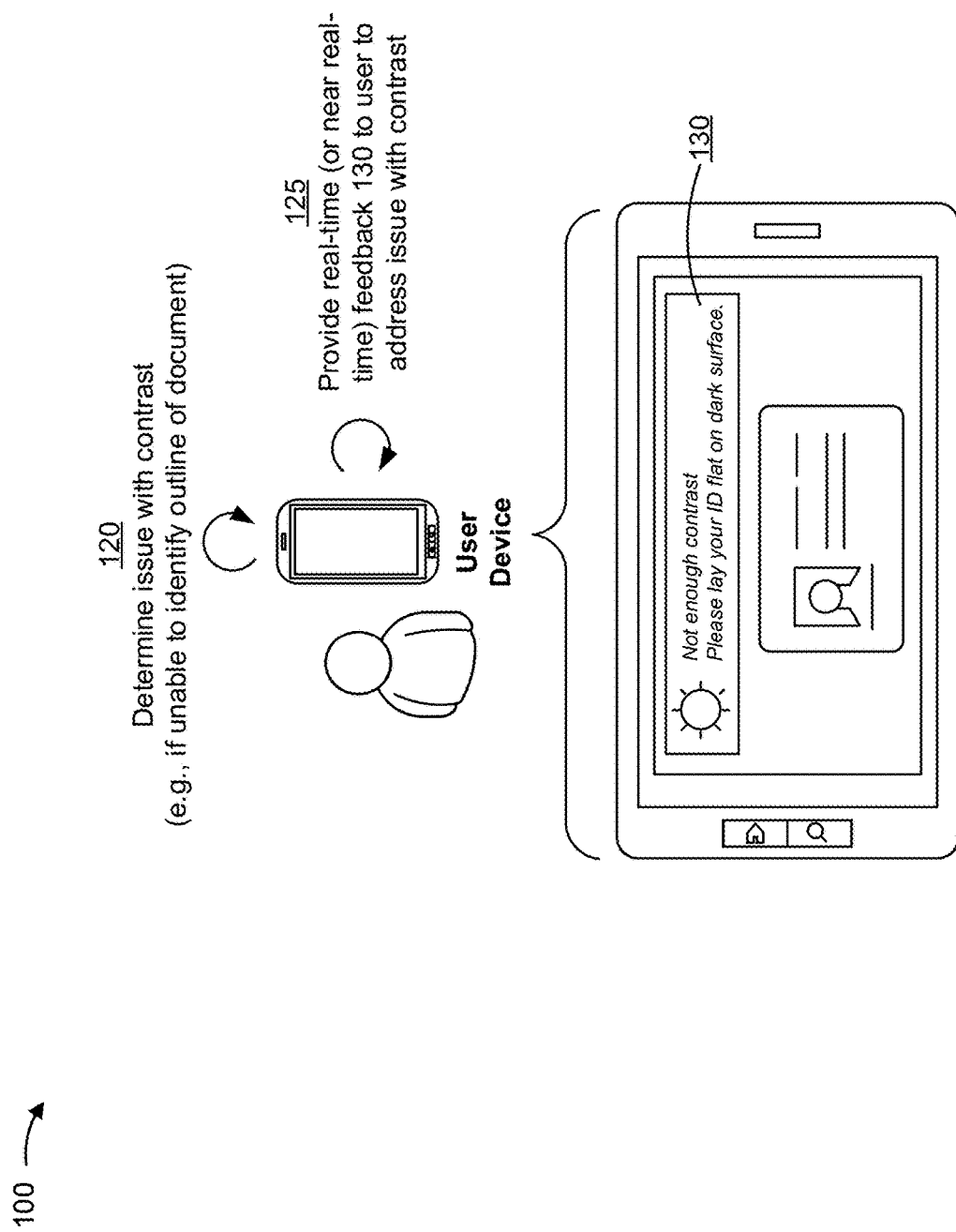

For example, in some cases, a document may be disposed on a surface having a color and/or a brightness that is similar to that of the document, which may result in low contrast in a preview frame. This can make it difficult for the user device (e.g., the image analysis and processing pipeline) to determine the outline of an object, in the preview frame, that corresponds to the document. As shown in FIG. 1B, for example, and as shown by reference number 120, the user device may determine an issue, relating to contrast, in the preview frame. In some implementations, the user device may calculate a contrast value by determining a standard deviation of a luminance channel, and may determine whether the contrast value satisfies a threshold (e.g., is greater than or equal to a certain percentage (e.g., 30%, 35%, 40%, and/or the like) of a maximum standard deviation (e.g., 127.5 in a case where byte range is from 0 to 255)). In a case where the contrast value does not satisfy the threshold (e.g., is less than the certain percentage of the maximum standard deviation), the user device may, as shown by reference number 125, provide real-time (or near real-time) feedback to the user to address the issue relating to contrast. For example, as shown by reference number 130, the user device may cause, to be presented on the user interface, a notification that identifies the issue relating to contrast, and that includes an instruction to the user to perform an action with respect to the document (e.g., such as to place the document on a darker surface to improve contrast). Continuing with the example, if the user performs the action, the user device may analyze one or more subsequent preview frames (e.g., by processing the subsequent preview frame(s) in a manner similar to that described above) to attempt to determine the outline of an object, in the subsequent preview frame(s), that corresponds to the document, and so on.

In a case where the outline of an object is successfully determined, the user device may, as shown in FIG. 1C, and as shown by reference number 135, cause a boundary box (reference number 140), that corresponds to the outline, to be displayed (e.g., in real-time (or near real-time)) as an overlay (e.g., an augmented reality overlay). This may indicate to a user that the user device has successfully identified the object. In some implementations, the user device may continuously and/or periodically update a position, an orientation, and/or a size of the boundary box based on movements of the user device (e.g., by identifying and/or tracking the position, the orientation, and/or the size of the object, even as the user device is moved (e.g., rotated and/or shifted)).

Figure 1D:
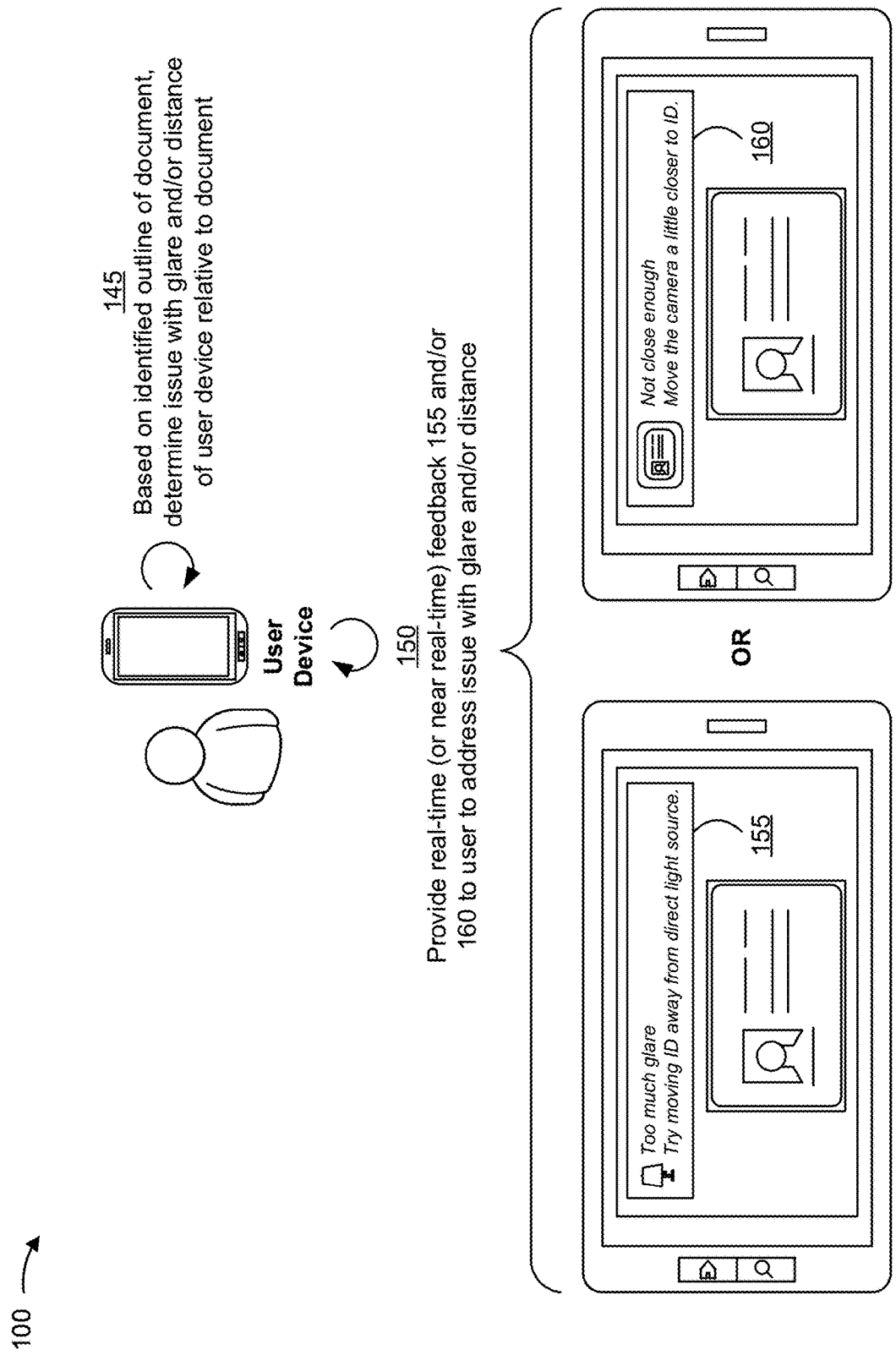

In addition, or as an alternative, to determining whether there is an issue relating to contrast, in some implementations, the user device may determine (e.g., based on, or after, determining the outline of an object) whether there is an issue, in preview frame(s), relating to glare and/or an issue relating to distance between the user device (e.g., the camera of the user device) and the document. Lower glare, and sharper focus, may result in a higher quality image, which enables improved object analysis and processing. A shorter distance, between the document and the camera of the user device, may also yield a higher quality image. Here, as shown in FIG. 1D, and as shown by reference number 145, the user device may determine that there is an issue relating to glare and/or the distance between the user device and the document.

For example, in some implementations, the user device (e.g., the image analysis and processing pipeline) may apply a filter, to a preview frame, for glare detection. In a case where the outline of the object is determined (e.g., as described above), the user device may apply the filter to only the pixels included in, or on, the outline. This targets the glare analysis to only the object (which corresponds to the document) identified in a preview frame, and not to any other object, such as that corresponding to a surface (e.g., a table and/or the like) upon which the document may be disposed. In some implementations, the user device may create a histogram (e.g., a masked histogram) of the luminance channel for a preview frame. For example, the luminance channel may be divided into a certain quantity of bins, where each bin corresponds to a certain percentage of the full luminance channel (e.g., 256 bins, where each bin corresponds to about 0.4% of the full luminance channel and/or the like). Additional details of the masked histogram are described below in connection with FIG. 1L. In some implementations, the user device may determine whether a glare percentage value—e.g., based on a quantity of pixels, that correspond to a certain range of bins (e.g., the last 3 bins representing 98.8% brightness and above and/or the like), relative to a total quantity of pixels under analysis-satisfies a threshold (e.g., is less than 0.5%).

In a case where the glare percentage value does not satisfy the threshold (e.g., is greater than or equal to 0.5%), the user device may, as shown by reference numbers 150 and 155, provide real-time (or near real-time) feedback to the user to address the issue relating to glare. For example, as shown by reference number 155, the user device may cause, to be presented on the user interface, a notification that identifies the issue relating to glare, and that includes an instruction to the user to perform an action with respect to the document (e.g., such as to move the document away from a light source). In some implementations, and as described in more detail below, the user device may calculate glare percentage values for multiple preview frames, and determine whether to provide the feedback based on the glare percentage values (e.g., based on an average of the glare percentage values, based on the best glare percentage value, and/or the like).

In some implementations, a similar histogram (e.g., that which is not masked, but that maps to the luminance channel for an entire preview frame, and not only to an object identified in the preview frame) may be utilized to determine a contrast value. For example, the user device may determine a contrast value, for a preview frame, based on how spread out the histogram is for that preview frame—e.g., a histogram having bars of similar sizes (where similar quantities of pixels exist across the luminance channel) may be indicative of poor contrast, and a histogram having bars of widely varying sizes may indicate that there is suitable contrast.

Returning to reference number 145, and as described above, the user device may determine that there is an issue relating to the distance between the user device and the document. In some implementations, the user device (e.g., the image analysis and processing pipeline) may determine if the user device is too far away from the document based on an analysis of the outline determined for an object in a preview frame. Here, for example, the user device may compare a width of the outline and a width of a camera preview display (e.g., the user interface) of the user device, and determine whether the user device is too far away from the document based on a result of the comparison. For example, the user device may determine whether a ratio, based on the width of the outline and the width of the camera preview display, satisfies a threshold (e.g., whether a ratio, of the width of the outline and the width of the camera preview display, is greater than or equal to 50% and/or the like). In a case where the ratio does not satisfy the threshold (e.g., is less than 50% and/or the like), the user device may, as shown by reference numbers 150 and 160, provide real-time (or near real-time) feedback to the user to address the issue relating to the distance. For example, as shown by reference number 160, the user device may cause, to be presented on the user interface, a notification that identifies the issue relating to distance, and that includes an instruction to the user to perform an action with respect to the user device (e.g., such as to move the camera of the user device closer to the document). In some implementations, and as described in more detail below, the user device may calculate such a ratio for multiple preview frames, and determine whether to provide the feedback based on the ratios (e.g., based on an average of the ratios, based on the best ratio, and/or the like).

Additionally, or alternatively, and in some implementations, the user device may, based on a known aspect ratio and/or size of a particular document or a particular type of document (e.g., a government-issued ID card and/or the like), determine an optimal size of an outline, display, on the user interface, a boundary box having such a size, and provide feedback to a user to move the user device, relative to the document, such that an object (in a preview frame), that corresponds to the document, is aligned within the boundary box.

Figure 1E:
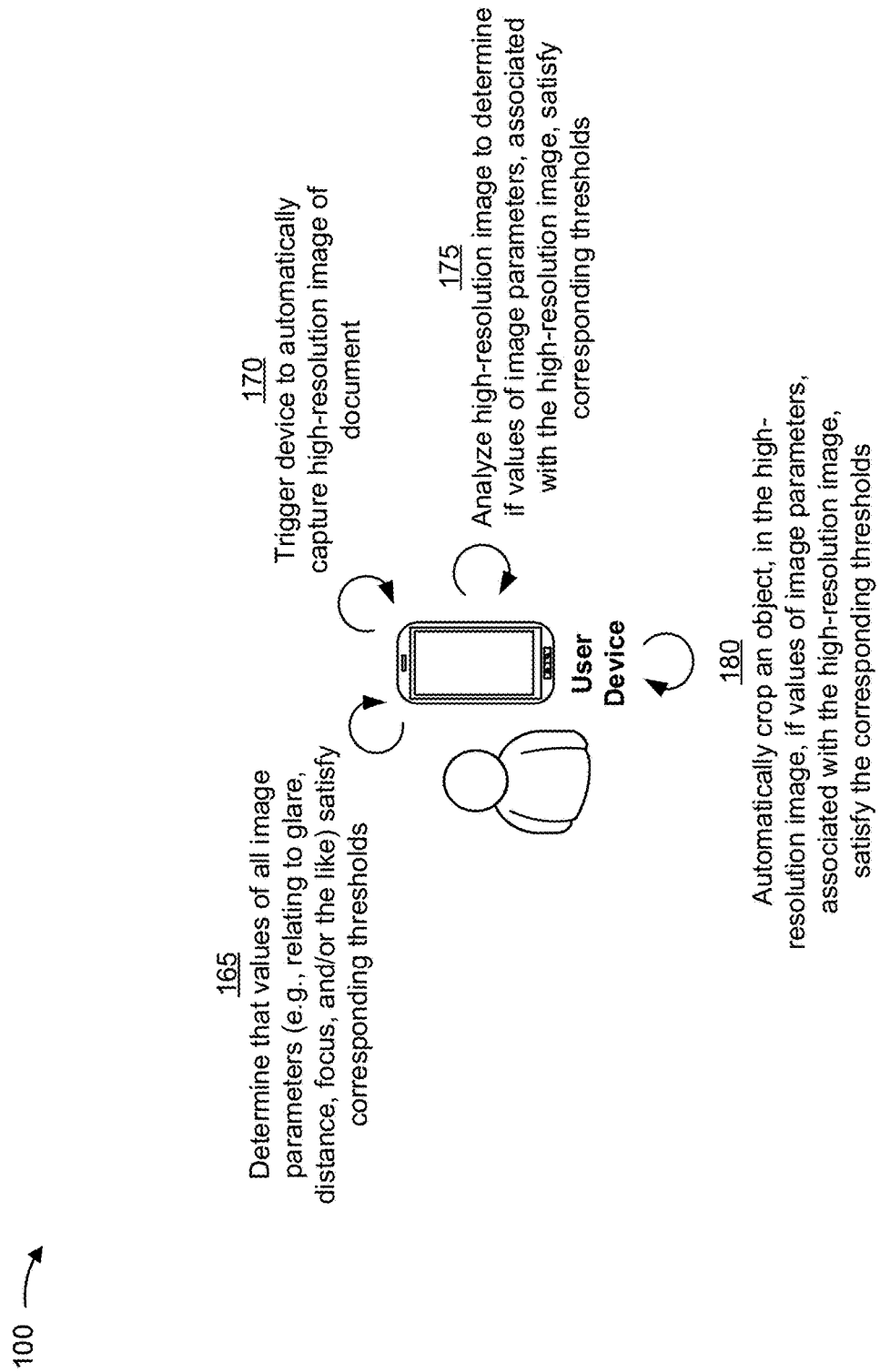

As shown in FIG. 1E, and as shown by reference number 165, the user device may determine that the values, associated with various image parameters, satisfy corresponding thresholds. For example, the user device may determine that the values, associated with contrast, glare, and distance and/or other image parameters, such as those relating to focus and/or the like, satisfy corresponding thresholds (and thus no feedback (e.g., no additional feedback) to the user needs to be provided). As shown by reference number 170, the user device may, based on the values satisfying the corresponding thresholds, automatically capture (autocapture) a high-resolution image of the document. In some implementations, an image resolution may be represented as a number of pixel columns (width) and a number of pixel rows (height), such as 1280×720, 1920×1080, 2592×1458, 3840×2160, 4128×2322, 5248×2952, 5312×2988, and/or the like, where high numbers of pixel columns and/or high numbers of pixel rows are associated with a high resolution. In some implementations, a high-resolution image indicates that the image has enough image detail for the user device, or another device, to process the image (e.g., a high-resolution image of a government-issued ID card has enough image detail to validate the information indicated on the government-issued ID card). In some implementations, and as described in more detail below, the user device may automatically capture the high-resolution image only if values, of image parameters for multiple preview frames, satisfy the corresponding thresholds. This may better ensure that optimal imaging conditions are stable (e.g., over multiple preview frames) before a high-resolution image is captured.

As shown by reference number 175, the user device may perform a post-capture analysis of the high-resolution image to determine if values, of image parameters (e.g., relating to contrast, glare, distance, and/or the like) associated with the high-resolution image, satisfy corresponding thresholds. In some cases, a user may move the user device slightly, between a time at which the user device determines that values, of the image parameters associated with preview frame(s), satisfy the corresponding thresholds (e.g., reference number 165) and a time at which the high-resolution image is automatically captured by the user device (e.g., reference number 170). Since such a movement might affect what is captured by the user device, performing a post-capture analysis of the high-resolution image may verify whether a high-quality image is actually captured. In a case where the values, of the image parameters associated with the high-resolution image, do not satisfy the corresponding thresholds, for example, the user device may determine not to utilize the high-resolution image, and continue to analyze preview frame(s) (e.g., in a manner similar to that described above) to determine whether to automatically capture another high-resolution image of the document, and so on. In this way, the user device may provide, to a backend platform for validation, only a high-resolution image that meets various image quality standards, which conserves network resources, computing resources, and memory resources, of the backend platform, that would otherwise be wasted receiving, storing, and processing low-quality images. In some implementations, the user device may identify an object, in the high-resolution image, corresponding to the document (e.g., in a manner similar to that described above), and may perform the post-capture analysis on only the object. In any case, if the user device determines that the values, of the image parameters associated with the high-resolution image, satisfy the corresponding thresholds, the user device may, as shown by reference number 180, automatically crop the object from the high-resolution image. In some implementations, the user device may also provide, to one or more external servers (e.g., a backend platform and/or the like), the high-resolution image for validation and/or information regarding calculations associated with the image parameters (e.g., calculations pertaining to contrast, glare, distance, focus, and/or the like) for image data analytics.

In this way, the user device (e.g., the image analysis and processing pipeline) may identify and/or track an object in preview frame(s), and provide real-time (or near real-time) feedback to a user, or trigger autocapturing of a high-resolution image, depending on the values of image parameters associated with the preview frame(s).

Figure 1F:
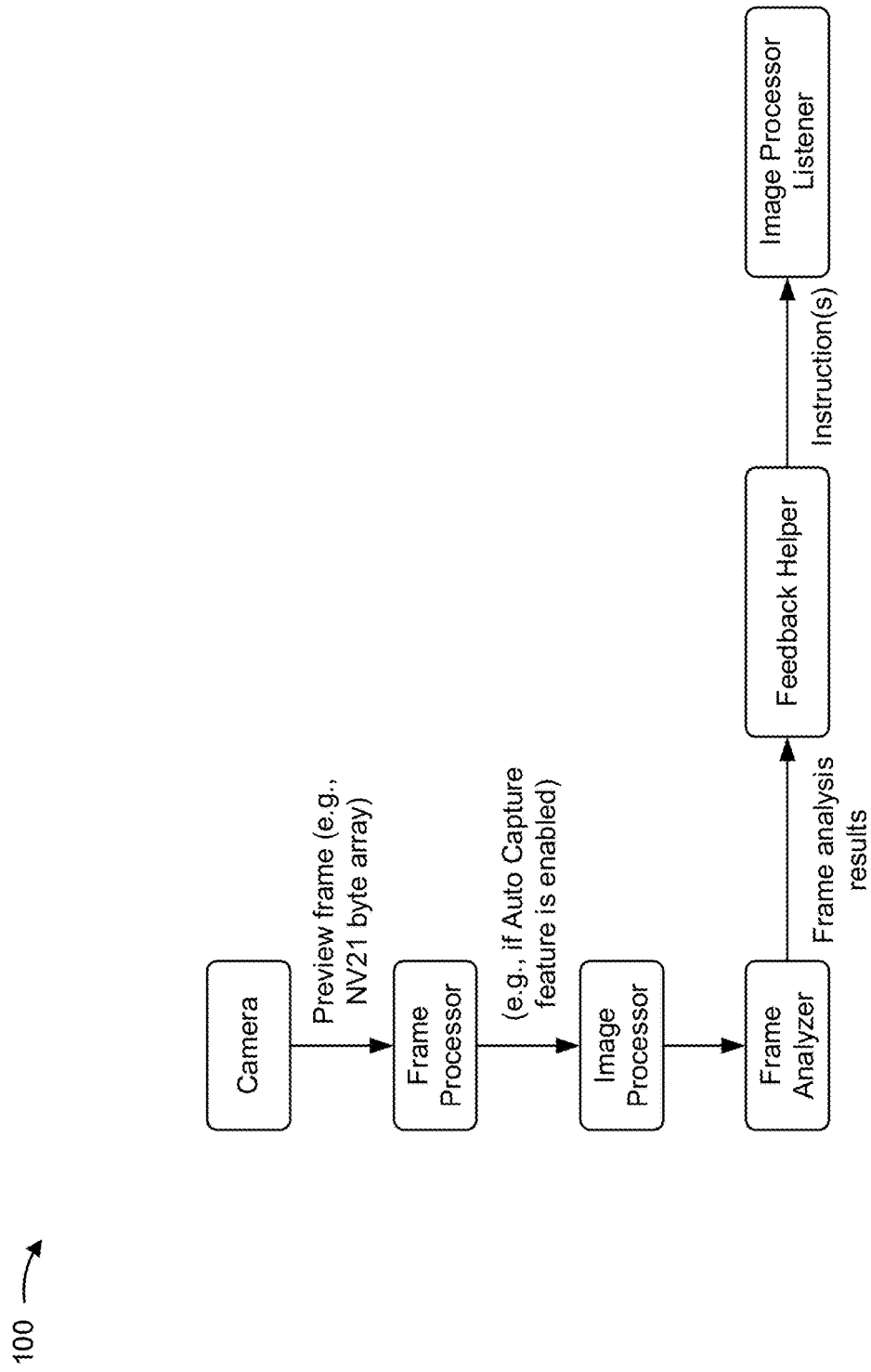

FIG. 1F is a block diagram of components or elements configured to implement various stages of an image analysis and processing pipeline described herein. As shown in FIG. 1F, the components or elements may be included, or implemented, in a user device, such as the user device described above in connection with FIGS. 1A-1E. As shown, a camera may capture, in real-time (or near real-time), a preview image of a document, and provide a corresponding preview frame (e.g., as an NV21 byte array) to a frame processor. In some implementations, the frame processor may copy data in the preview frame (e.g., to prevent modification to the original preview frame), and provide the copy of the data to an image processor. In some implementations, the frame processor may provide the copy of the data only if an autocapture feature, or function, is enabled. In some implementations, the user device may provide an option (e.g., via a user interface, such as that described above in connection with FIGS. 1A-1E) for a user to enable or disable the autocapture feature. Permitting a user to disable the autocapture feature may help conserve computing resources and memory resources of the user device, for example, in case where autocapture is not needed.

In a first stage of the image analysis and processing pipeline, the image processor may receive the copy of the data from the frame processor, and process the data to derive a grayscale image (e.g., similar to that described above in connection with reference number 115 of FIG. 1A). In a second stage of the image analysis and processing pipeline, the frame analyzer may process and/or analyze the grayscale image by performing various processing operations. For example, the frame analyzer may perform edge detection to detect an object of interest (e.g., a document) in the grayscale image, including by filtering all detected objects in the grayscale image (e.g., based on aspect ratio and/or size), and tracking a position, a size, and/or rotation of the objects. In various implementations, the frame analyzer may perform one of more of the processing operations described above in connection with reference number 115 of FIG. 1A, reference number 120 of FIG. 1B, and/or reference number 145 of FIG. 1D, including, for example, blurring, filtering, dilation, contour identification, shape detection, bounding rectangle creation, bounding rectangle filtering, calculating contrast values, calculating glare percentage values, calculating distance-related ratio values, calculating focus-related values, and/or the like. In some implementations, various calculations, such as those relating to contrast, glare, distance, focus, and/or the like, and tracking of object size, object position, object rotation, and/or the like, may be performed as part of a third stage of the image analysis and processing pipeline.

In a fourth stage of the image analysis and processing pipeline, the frame analyzer may (e.g., as shown in FIG. 1F) provide frame analysis results (e.g., outputs) to a feedback helper. Here, the feedback helper may, based on the frame analysis results, determine whether to provide real-time (or near real-time) feedback to a user of the user device (e.g., feedback relating to contrast, glare, distance, and/or the like, as described above in connection with FIGS. 1A-1E), whether to display a boundary box corresponding to an outline of an object of interest (e.g., as described above with respect to reference number 140 of FIG. 1C), and/or the like.

In a case where the feedback helper determines to provide real-time (or near real-time) feedback to the user and/or to display the boundary box, the feedback helper may provide one or more corresponding instructions to the image processor listener. The image processor listener may, based on the instruction(s), cause the user interface to present the feedback and/or the boundary box (e.g., as described above in connection with FIGS. 1A-1E). In some implementations, the feedback helper may review frame analysis results for multiple preview frames, and determine if values, of image parameters (e.g., relating to glare, distance, focus, and/or the like) associated with multiple preview frames, satisfy corresponding thresholds. For example, the user device may, as part of determining whether to provide feedback to a user of the device or to trigger autocapturing of a high-resolution image of the document, determine whether a contrast value satisfies a corresponding threshold, whether an average glare percentage value for multiple preview frames (e.g., the five most recent, processed preview frames) satisfies a corresponding threshold, whether an average ratio value (associated with the distance between the user device and the document) for multiple preview frames (e.g., the three most recent, processed preview frames) satisfies a corresponding threshold, and/or whether other conditions, such as those relating to focus, user device motion stability (e.g., described in more detail below), and/or the like, satisfy corresponding thresholds. In a case where the feedback helper determines that some or all of such thresholds are satisfied, the feedback helper may output an instruction that causes the camera to automatically capture a high-resolution image of the document.

In some implementations, focus may relate to how well edges are defined in an image, a quantity of edges that are detected in an image, and/or the like. In some implementations, a continuous autofocus feature (e.g., included in the user device) may provide information regarding a current focus of the camera, which may be used by the image analysis and processing pipeline to determine when to trigger autocapture. As an example, a certain quantity of the most recent preview frames captured by the user device (e.g., the four most recent preview frames and/or the like) may be analyzed to determine whether a properly focused image is being captured by the user device, and thus whether autocapture may be permitted.

In some implementations, the user device may be configured to utilize frame analysis results, for a prior preview frame, to assist with determining the outline of an object in a current preview frame. This reduces a quantity of calculations needed for processing preview frames, which optimizes, and increases the overall speed of, the image analysis and processing pipeline.

Figure 1G:
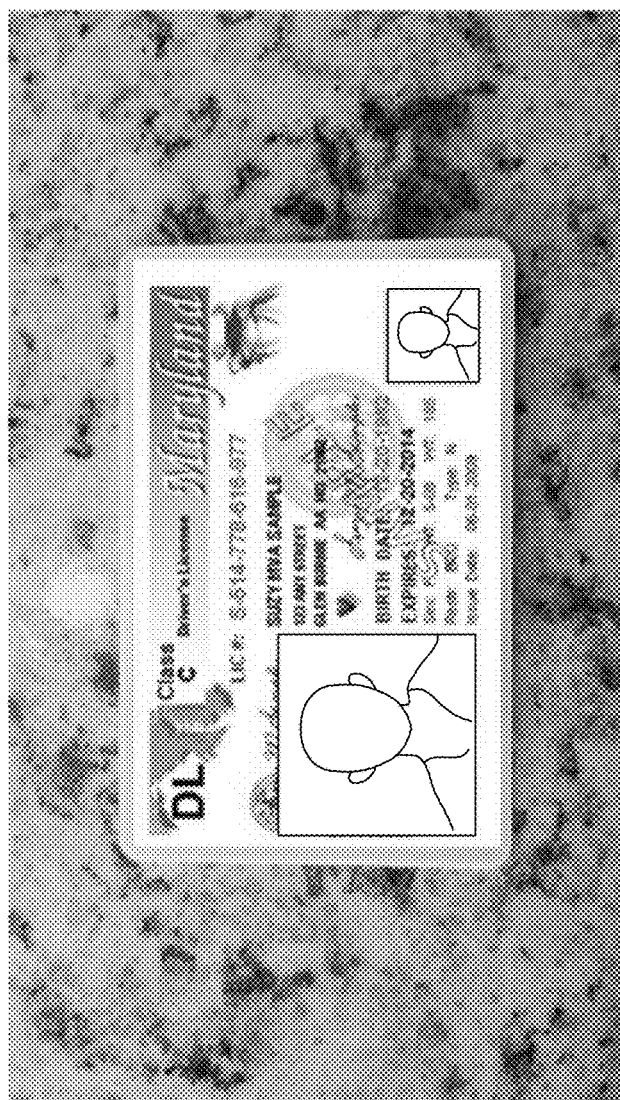
Figure 1H:
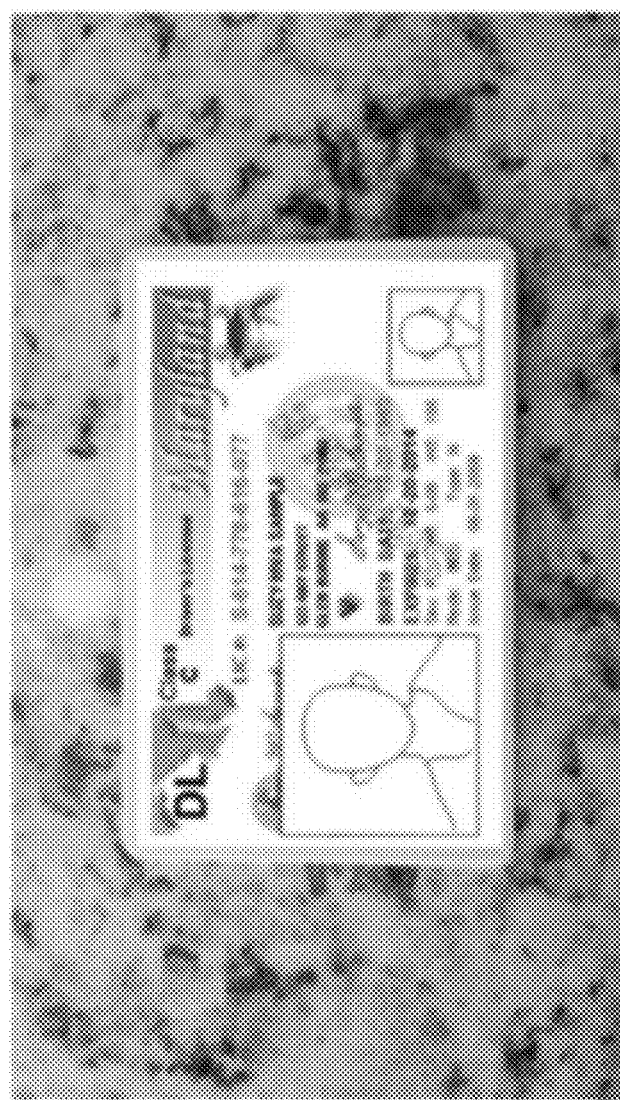
Figure 1I:
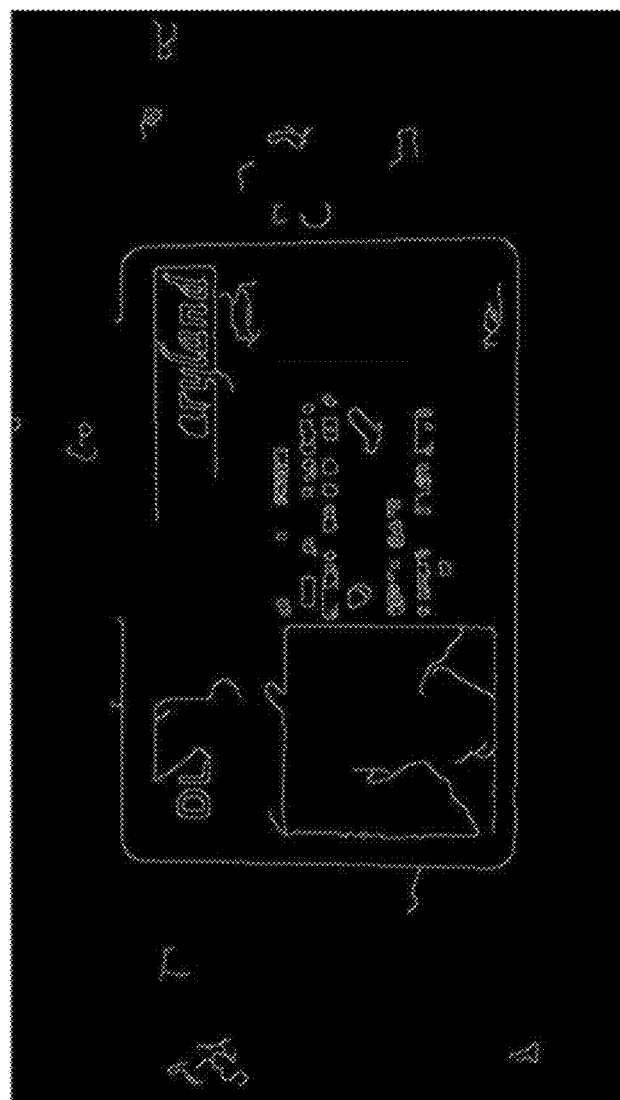
Figure 1J:
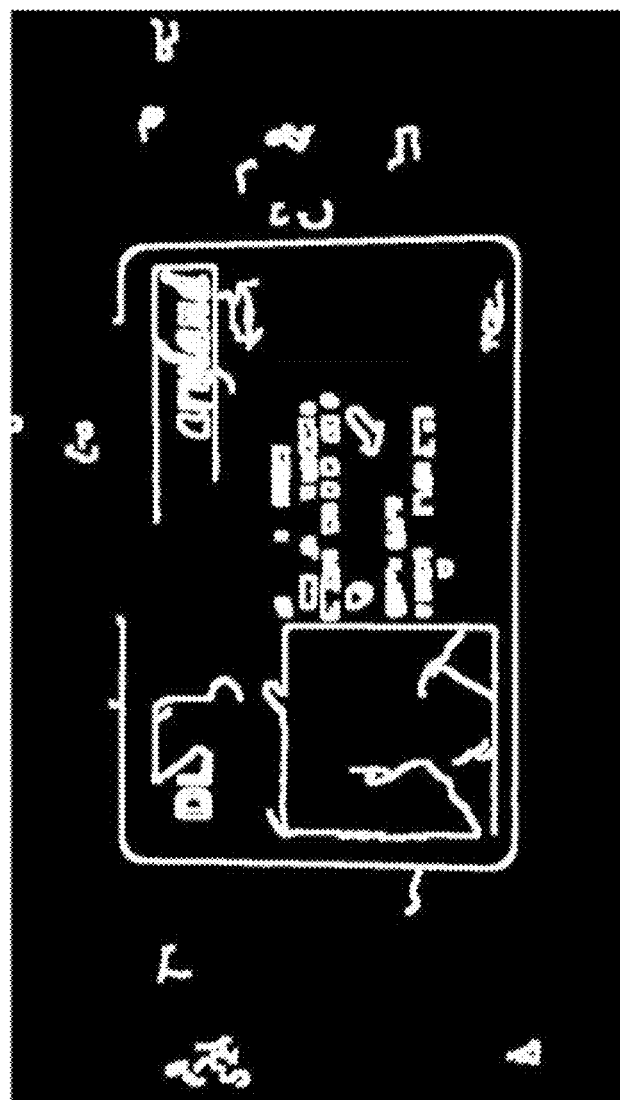
Figure 1K:
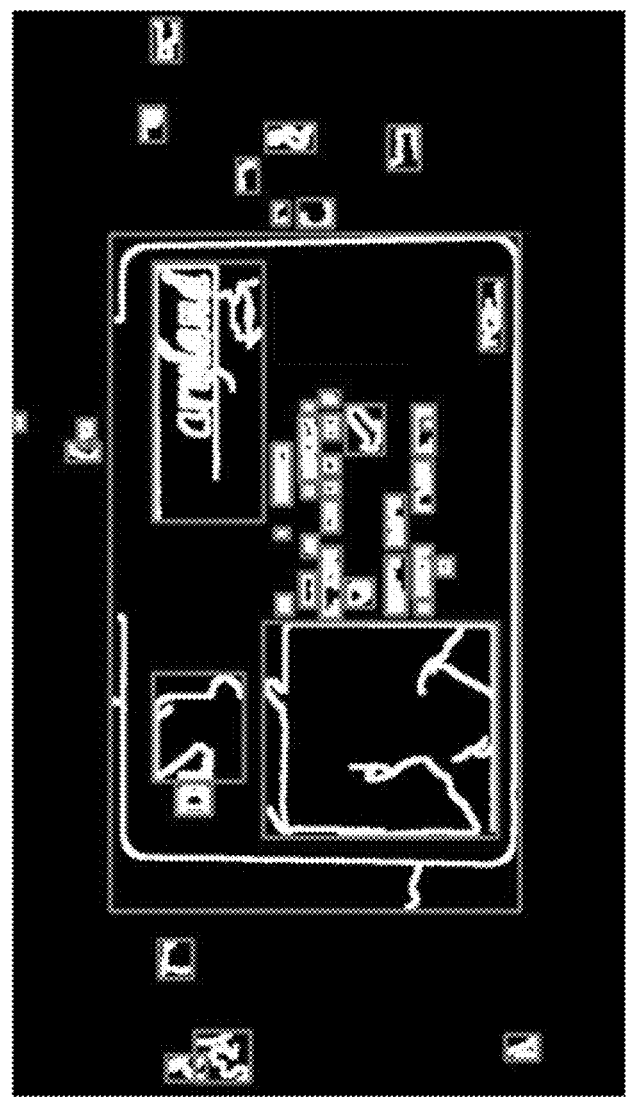

FIGS. 1G-1K are diagrams of a preview frame that is subjected to various processing operations (e.g., processing operations performed by the image analysis and processing pipeline, as described above in connection with FIGS. 1A-1E). As shown in FIG. 1G, the preview frame may include an image of a document (e.g., here, a government-issued ID card) that has been converted (e.g., from a color image) into a grayscale image. As shown in FIG. 1H, the grayscale image may be blurred to facilitate edge detection. As shown in FIG. 1I, edges of various objects identified in the blurred image may be detected, and as shown in FIG. 1J, pixels in, or proximate to, the detected edges may be dilated to fill in any gaps that might exist between lines. As shown in FIG. 1K, bounding rectangles may be created for one or more identified objects. Although not shown, a filtering process may be performed, on the bounding rectangles (e.g., based on an aspect ratio and/or a size of a typical government-issued ID card), to determine an outline of an object that corresponds to the document (e.g., as described above in connection with FIGS. 1A-1E).

In this way, the image analysis and processing pipeline may guide a user in the image capturing process via real-time (or near real-time) feedback, and ensure that only high-quality images of a document are ultimately captured (and, for example, uploaded to a backend platform for validation). This shortens, and simplifies, the image capturing process, which conserves computing resources, power resources, and memory resources of the device that would otherwise need to be expended in cases where low-quality images are repeatedly captured. In addition, this conserves computing resources, memory resources, and network resources, associated with a backend platform, that would otherwise need to be expended to receive and process such low-quality images.

Figure 1L:
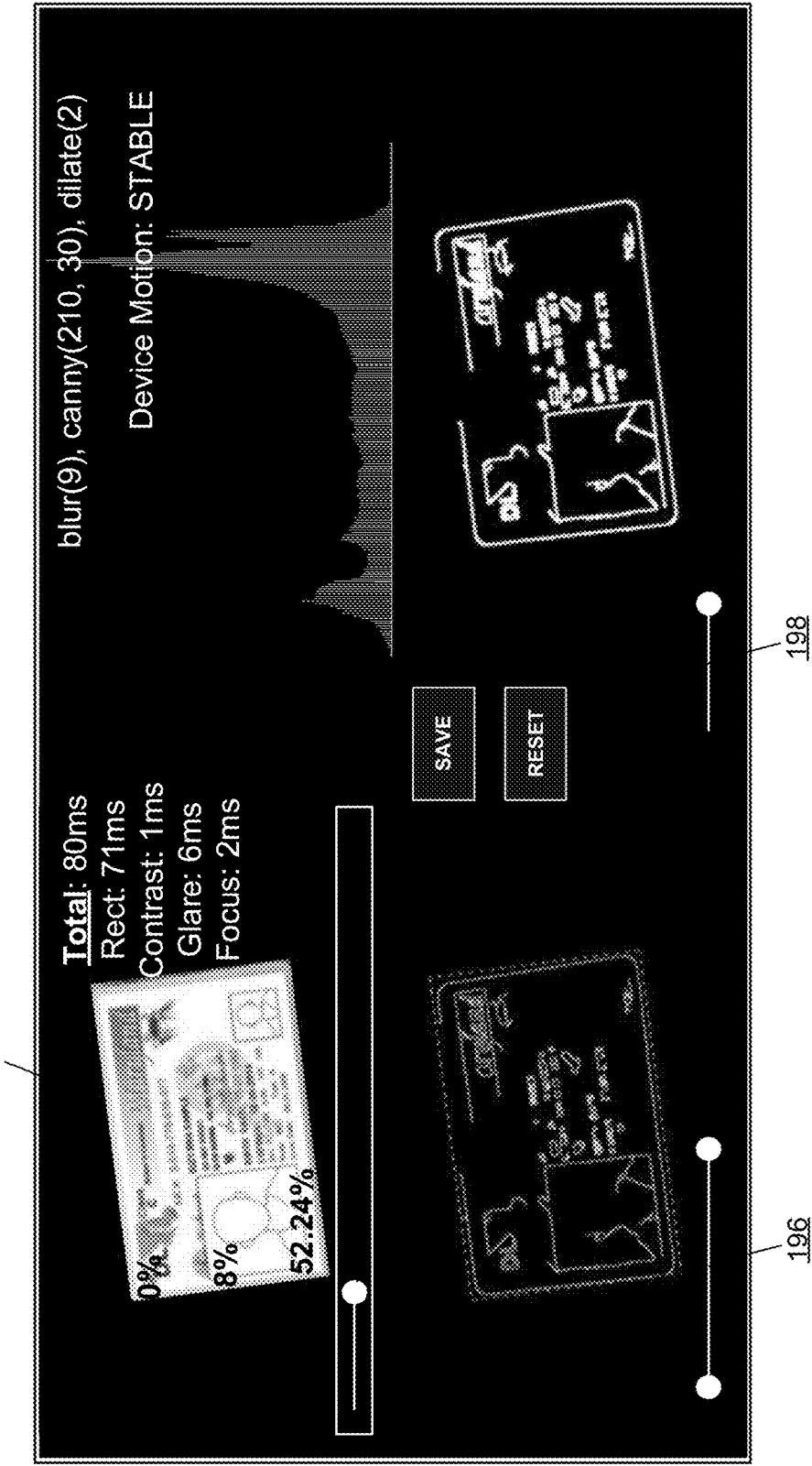

In some implementations, a visualization and configuration system (or tool) may be provided to facilitate debugging and development of a real-time (or near real-time) image analysis and processing pipeline (e.g., such as that described above in connection with FIGS. 1A-1K above). For example, FIG. 1L is a diagram of an example visualization and configuration system that includes a user interface presented on a user device (e.g., the user device in which the image analysis and processing pipeline is implemented or executing). In some implementations, the visualization and configuration system may be implemented as an application that interacts with various stages of the image analysis and processing pipeline to receive values of image parameter calculations (e.g., relating to contrast, glare, focus, distance, and/or the like) and to provide configuration parameter adjustments to the image analysis and processing pipeline. At initialization, for example, the visualization and configuration system may provide default configuration parameter values to the image analysis and processing pipeline, and may subsequently provide configuration parameter adjustments to the image analysis and processing pipeline based on user input(s), such as selection(s) of user-selectable option(s) presented on the user interface (e.g., as described in more detail below).

As shown in FIG. 1L, the user interface may include multiple quadrants—e.g., here, four quadrants, including a top left quadrant, a top right quadrant, a bottom right quadrant, and a bottom left quadrant—that correspond to one or more stages of the image analysis and processing pipeline. As shown, the user interface may display, in the top left quadrant, a view of what a user of the user device may observe during execution of the image analysis and processing pipeline. Here, for example, the user interface may present a preview image, including an object corresponding to a document (e.g., a government-issued ID card), that has been converted into grayscale and blurred (e.g., as described above in connection with FIGS. 1A-1K). As further shown in FIG. 1L, the user interface may provide a user-selectable option 192 (e.g., in the form of a slide bar with a seek handle) that permits a user (e.g., a developer of the image analysis and processing pipeline) to adjust a configuration parameter of the image analysis and processing pipeline—e.g., for adjusting an amount of blur to be applied to the grayscale image. As shown, the user interface may also present a boundary box 194 that corresponds to an outline, of the object, determined by the image analysis and processing pipeline (e.g., as described above in connection with FIGS. 1A-1K). In some implementations, boundary box 194 may be presented in a particular color (e.g., pink, blue, and/or the like) so as to visually indicate, to a user, that the image analysis and processing pipeline has successfully identified the object.

As further shown in FIG. 1L, the user interface may present (e.g., as an overlay), in the top left quadrant, various image parameter-related information and/or performance data. For example, as shown, the image parameter-related information may include values, relating to contrast, glare, focus, distance, and/or the like, calculated for a preview frame. In some implementations, the user interface may continuously update the displayed values as updated calculations are made for each processed preview frame. Although not shown, in some implementations, the user interface may present the values in a different manner (e.g., in a different color, in bold or not in bold, and/or the like) depending on whether the values satisfy corresponding thresholds. For example, the user interface may present a value relating to distance in one color (e.g., red and/or the like) in a case where the value does not satisfy a corresponding threshold, and may present the value in a different color (e.g., white and/or the like) in a case where the value does satisfy the corresponding threshold. This visually aids a user in identifying issues with any of the image parameters.

As further shown in FIG. 1L, the performance data may include information identifying, for a given preview frame, a duration of time needed to perform various processing operations (e.g., corresponding to one or more stages of the image analysis and processing pipeline)—e.g., a duration of time needed to determine the outline of an object (e.g., shown as "Rect" in FIG. 1L), a duration of time needed to determine a contrast value, a duration of time needed to determine a glare percentage value, a duration of time needed to determine a focus-related value, and/or the like. As further shown, a total duration of time needed to perform all such processing operations may also be displayed. This permits a user to assess the general performance of the image analysis and processing pipeline (e.g., based on any adjustments made to the configuration parameters and/or the like), including a quantity of frames per second that the image analysis and processing pipeline may be capable of processing when deployed on different user devices (e.g., different types of user devices).

As further shown in FIG. 1L, the user interface may display, in each of the bottom left quadrant and the bottom right quadrant, an image that has been subjected to processing by the image analysis and processing pipeline-here, for example, the detection of edges (bottom left quadrant) and the dilation of pixels associated with such edges (bottom right quadrant). As shown, the user interface may provide a user-selectable option 196 (e.g., in the form of a slide bar having two seek handles and/or the like) that permits the user to adjust other configuration parameter(s) of the image analysis and processing pipeline—e.g., here, two edge detection parameters, relating to an edge detection function (e.g., the Canny edge detection function), that are individually adjustable via one of the two seek handles of the slide bar. As further shown, the user interface may provide a user-selectable option 198 (e.g., in the form of a slide bar and/or the like) that permits the user to adjust yet another configuration parameter of the image analysis and processing pipeline—e.g., here, a dilation parameter relating to a dilation process.

As further shown in FIG. 1L, the user interface may display, in the top right quadrant, a current value of one or more of the configuration parameters that may be adjusted via user-selectable options 192, 196, and/or 198. For example, as shown, the user interface may display current values of configuration parameters relating to blurring, edge detection (shown as "canny"), and dilation.

As further shown in FIG. 1L, the user device may display, in the top right quadrant, a histogram that represents an amount of glare throughout a given preview frame. In some implementations, the histogram may correspond to the masked histogram described above in connection with FIG. 1D. In some implementations, the histogram may display a distribution of a luminance channel (e.g., a distribution of brightness) in the preview frame—e.g., a progression from the left side of the histogram, representing quantities of pixels corresponding to darker portions of the preview frame, to the right side of the histogram, representing quantities of pixels corresponding to brighter parts of the preview frame. In some implementations, the bars of the histogram may be presented in one or more colors. For example, all the bars may be presented in a first color (e.g., white and/or the like), except for a certain quantity of bars (e.g., the last 3 bars corresponding to the last 3 bins, as described above in connection with FIG. 1D), which may be presented in a second color (e.g., red and/or the like). Additionally, or alternatively, in some implementations, the bars may be presented in a gradual succession of brightness (or colors) e.g., from darker bars (on the left of the histogram) to lighter bars (on the right of the histogram)—so as to visually indicate a brightness level represented by each bar.

In some implementations, the user device may include one or more motion sensors (e.g., accelerometers, gyroscopes, and/or the like) that provide motion data regarding the user device. In such cases, the visualization and configuration system may monitor and/or analyze the motion data to determine a motion stability value of the user device. As further shown in FIG. 1L, the user device may display, in the top right quadrant, an indicator that identifies a measure of motion stability of the user device. For example, the indicator may be presented in a first color (e.g., green and/or the like) if a measure of motion stability satisfies (e.g., is greater than or equal to) a threshold, and may be presented in a second color (e.g., red and/or the like) if the measure of motion stability does not satisfy (e.g., is less than) the threshold.

In some implementations, the user device may determine whether to permit autocapturing of a high-resolution image based on motion stability of the user device (e.g., in addition to determining whether to permit autocapturing of a high-resolution image based on contrast, glare, focus, distance, and/or the like). In various implementations, a determination of whether to permit autocapture may be based on a variety of factors—e.g., based on glare percentage values for the five most recent, processed preview frames, based on distance-related ratio values for the three most recent, processed preview images, based on motion stability values over a certain period of time, and/or the like-which better ensures that a high-resolution image, that meets image quality standards, is ultimately captured.

As further shown in FIG. 1L, the user interface may provide a user-selectable option to reset some, or all, of the configuration parameters of the image analysis and processing pipeline to default values, which may be useful for debug purposes. As further shown, the user interface may provide an option (e.g., shown in FIG. 1L as a "SAVE" button) that permits a user to export raw image data (e.g., data corresponding to one or more preview frames, such as an initial preview frame captured by the user device) in one or more image file formats, such as Joint Photographic Experts Group (JPEG), Portable Network Graphics (PNG), Bitmap (BMP), Graphics Interchange Format (GIF), Tagged Image File Format (TIFF), and/or the like. This permits a user to utilize raw image data as sample data for automated testing of the image analysis and processing pipeline. Although not shown, in some implementations, the user interface may provide a user-selectable option to store current configuration parameter values (e.g., as new default values and/or for later use).

In this way, the performance of an image analysis and processing pipeline may be efficiently tested in isolation, and in a variety of user devices and test environments. Inefficiencies in the image analysis and processing pipeline may be identified and corrected, and optimal configuration parameters may also be determined. In addition, permitting a user to observe the progression of image processing, at various stages of the image analysis and processing pipeline, is particularly beneficial, since small adjustments to the configuration parameters, at a given stage, may have a large impact on an end result. For example, a user may, based on observations gained from the visualization and configuration system, develop automated test(s) for continuously validating the image analysis and processing pipeline (e.g., by adjusting inputs and observing corresponding outputs of the image analysis and processing pipeline). This simplifies the development process, and conserves computing resources and power resources that would otherwise need to be expended as part of typical debug sessions. Moreover, implementing the visualization and configuration system in the same device, on which the image analysis and processing pipeline is executing, also enables a user to freely test the image analysis and processing pipeline, without a need to connect the user device to an external computing device (as may otherwise be needed for debug purposes), which also simplifies the development process, and conserves computing resources and power resources.

As indicated above, FIGS. 1A-1L are provided merely as examples. Other examples are possible and may differ from what was described with regard to FIGS. 1A-1L. For example, although FIG. 1L shows a visualization and configuration system implemented as a user interface that includes four quadrants, more or fewer quadrants may be included as needed (e.g., more quadrants may be included to show images subjected to other processing operations of the image analysis and processing pipeline, such as the identification of contours, the creation of bounding rectangles, and/or the like described above in connection with FIGS. 1A-1K).

Additionally, although FIG. 1L shows the various data or features (e.g., the values of image parameters, the values of configuration parameters, the performance data, and the user-selectable options) in a particular layout on the user interface, the user interface may present the data and features in one or more other layouts.

Further, implementations of the visualization and configuration system may be executed on an external device that is remote from, but communicatively coupled (e.g., via a wired connection and/or a wireless connection) to, the user device, which permits monitoring of the performance of the image analysis and processing pipelines on various types of user devices.

Figure 2:
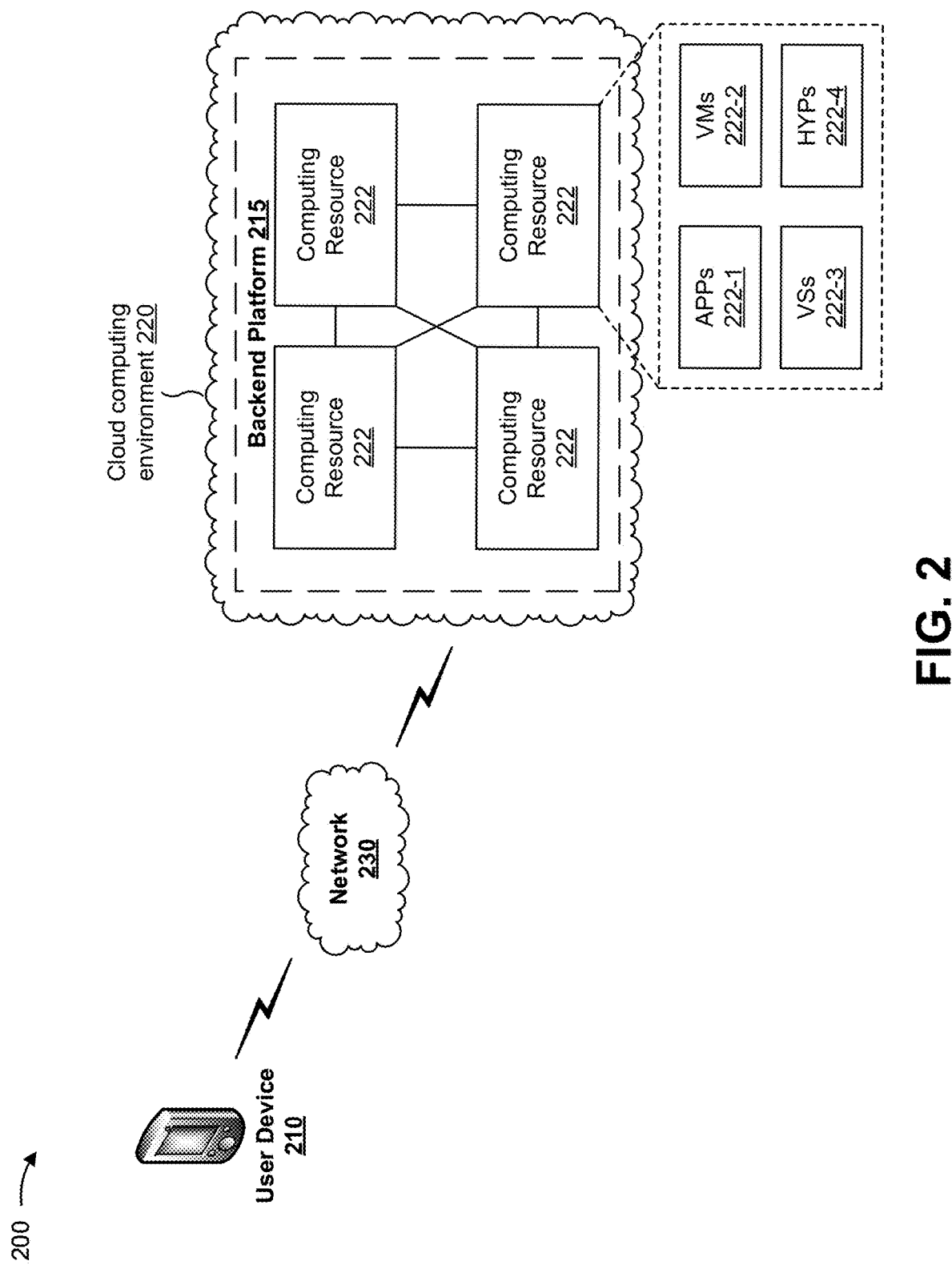
FIG. 2 is a diagram of an example environment in which systems and/or methods, described herein, may be implemented.

Furthermore, in various implementations, some or all of the operations and/or functions described herein as being performed by a user device, may additionally, or alternatively, be performed by a backend server or platform, such as backend platform 215 of FIG. 2).

FIG. 2 is a diagram of an example environment 200 in which systems and/or methods, described herein, may be implemented. As shown in FIG. 2, environment 200 may include a user device 210, a backend platform 215, a cloud computing environment 220, and a network 230. Devices of environment 200 may interconnect via wired connections, wireless connections, or a combination of wired and wireless connections.

User device 210 includes one or more devices capable of receiving, generating, storing, processing, and/or providing information associated with images. For example, user device 210 may include a communication and/or computing device, such as a mobile phone (e.g., a smart phone, a radiotelephone, etc.), a desktop computer, a laptop computer, a tablet computer, a handheld computer, a gaming device, a device integrated within a vehicle, a wearable communication device (e.g., a smart wristwatch, a pair of smart eyeglasses, etc.), or a similar type of device. In some implementations, user device 210 may include an image analysis and processing pipeline for facilitating the capture of high-resolution images and/or a visualization and configuration system for facilitating debugging and/or configuration of the image analysis and processing pipeline in real-time (or near real-time), as described elsewhere herein.

Backend platform 215 includes one or more devices capable of receiving, generating, storing, processing, and/or providing information associated with images. Backend platform 215 may include a server device or a group of server devices. In some implementations, as shown, backend platform 215 can be hosted in cloud computing environment 220. Notably, while implementations, described herein, describe backend platform 215 as being hosted in cloud computing environment 220, in some implementations, backend platform 215 is not cloud-based or can be partially cloud-based. In some implementations, backend platform 215 may receive, from user device 210, high-resolution images and/or information regarding captured images, as described elsewhere herein.

Cloud computing environment 220 includes an environment that delivers computing as a service, whereby shared resources, services, etc. can be provided to user device 210 and/or one or more other backend platforms 215. Cloud computing environment 220 can provide computation, software, data access, storage, and/or other services that do not require end-user knowledge of a physical location and configuration of a system and/or a device that delivers the services. As shown, cloud computing environment 220 can include a set of computing resources 222.

Computing resource 222 includes one or more personal computers, workstation computers, server devices, or another type of computation and/or communication device. In some implementations, computing resource 222 can host backend platform 215. The cloud resources can include compute instances executing in computing resource 222, storage devices provided in computing resource 222, data transfer devices provided by computing resource 222, etc. In some implementations, computing resource 222 can communicate with other computing resources 222 via wired connections, wireless connections, or a combination of wired and wireless connections.

As further shown in FIG. 2, computing resource 222 can include a group of cloud resources, such as one or more applications ("APPs") 222-1, one or more virtual machines ("VMs") 222-2, virtualized storage ("VSs") 222-3, one or more hypervisors ("HYPs") 222-4, and/or the like.

Application 222-1 includes one or more software applications that can be provided to or accessed by user device 210. Application 222-1 can eliminate a need to install and execute the software applications on user device 210. For example, application 222-1 can include software associated with backend platform 215 and/or any other software capable of being provided via cloud computing environment 220. In some implementations, one application 222-1 can send/receive information to/from one or more other applications 222-1, via virtual machine 222-2.

Virtual machine 222-2 includes a software implementation of a machine (e.g., a computer) that executes programs like a physical machine. Virtual machine 222-2 can be either a system virtual machine or a process virtual machine, depending upon use and degree of correspondence to any real machine by virtual machine 222-2. A system virtual machine can provide a complete system platform that supports execution of a complete operating system (OS). A process virtual machine can execute a single program, and can support a single process. In some implementations, virtual machine 222-2 can execute on behalf of a user (e.g., user device 210) and/or on behalf of one or more other backend platforms 215, and can manage infrastructure of cloud computing environment 220, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 222-4 provides hardware virtualization techniques that allow multiple operating systems (e.g., "guest operating systems") to execute concurrently on a host computer, such as computing resource 222. Hypervisor 222-4 can present a virtual operating platform to the guest operating systems, and can manage the execution of the guest operating systems. Multiple instances of a variety of operating systems can share virtualized hardware resources.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
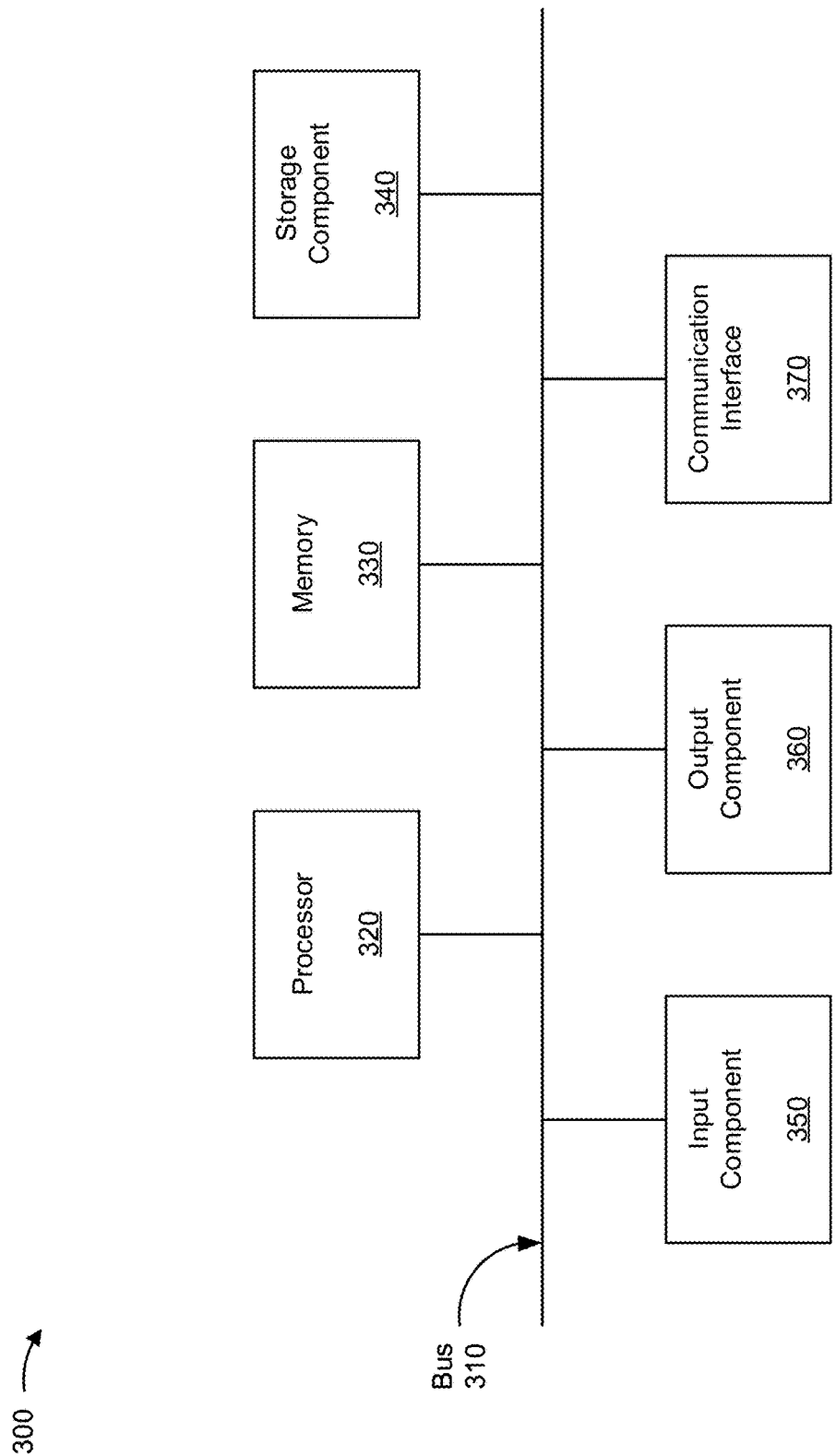
FIG. 3 is a diagram of example components of one or more devices of FIG. 2.

FIG. 3 is a diagram of example components of a device 300. Device 300 may correspond to user device 210 and/or backend platform 215. In some implementations, user device 210 and/or backend platform 215 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, an actuator, and/or an image sensor (e.g., a camera and/or the like)). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
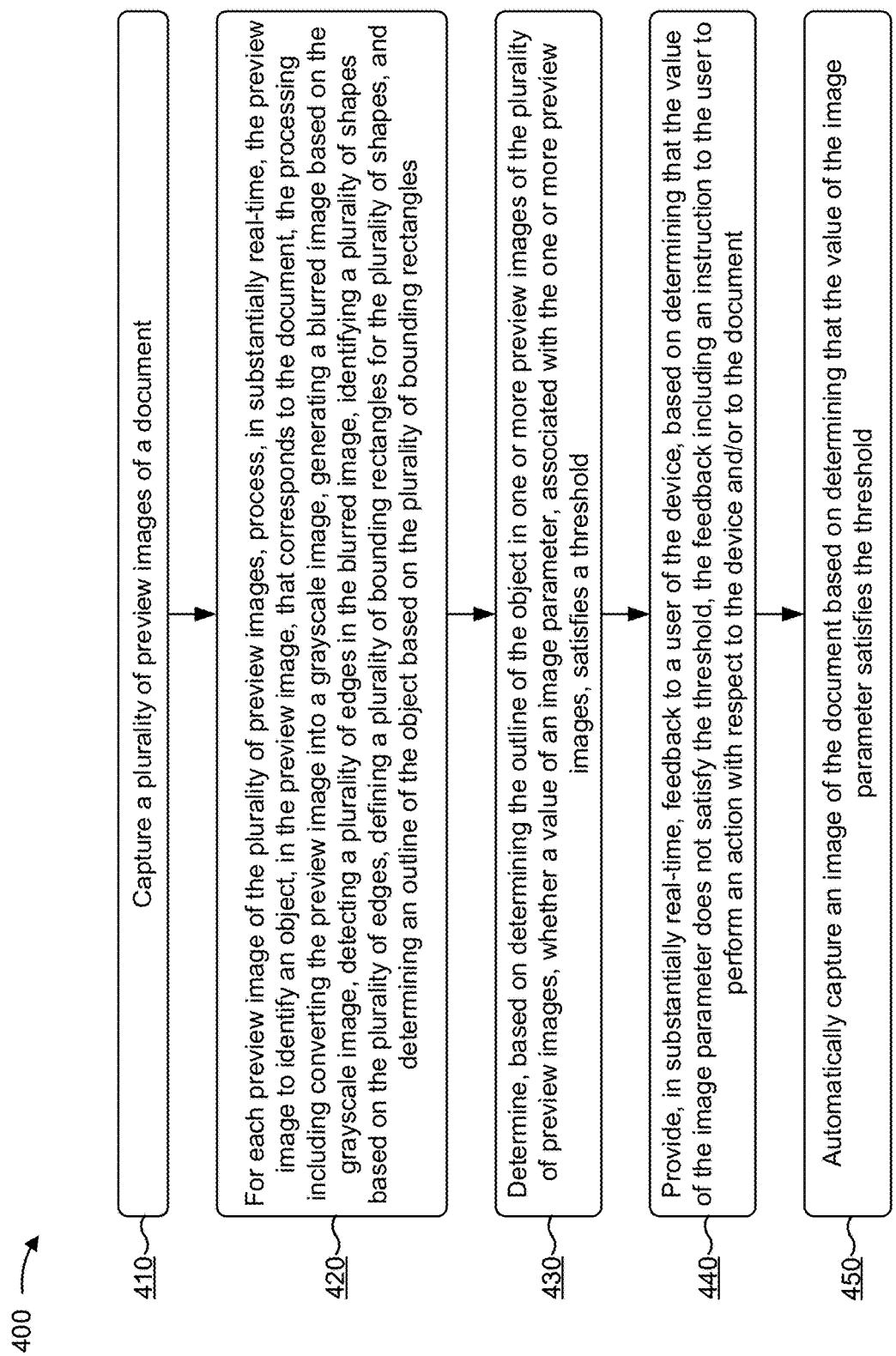
FIG. 4 is a flow chart of an example process for facilitating capturing of a high-resolution image using a real-time, or near real-time, image analysis and processing pipeline.

FIG. 4 is a flow chart of an example process 400 for facilitating capturing of a high-resolution image using a real-time, or near real-time, image analysis and processing pipeline. In some implementations, one or more process blocks of FIG. 4 may be performed by a user device (e.g., user device 210). In some implementations, one or more process blocks of FIG. 4 may be performed by another device or a group of devices separate from or including the user device, such as backend platform 215.

As shown in FIG. 4, process 400 may include capturing a plurality of preview images of a document (block 410). For example, the user device (e.g., using processor 320, memory 330, storage component 340, input component 350, and/or the like) may capture a plurality of preview images of a document, as described above in connection with FIGS. 1A-1L.

As further shown in FIG. 4, process 400 may include, for each preview image of the plurality of preview images, processing, in substantially real-time, the preview image to identify an object, in the preview image, that corresponds to the document, the processing including converting the preview image into a grayscale image, generating a blurred image based on the grayscale image, detecting a plurality of edges in the blurred image, identifying a plurality of shapes based on the plurality of edges, defining a plurality of bounding rectangles for the plurality of shapes, and determining an outline of the object based on the plurality of bounding rectangles (block 420). For example, the user device (e.g., using processor 320, memory 330, storage component 340, and/or the like) may, for each preview image of the plurality of preview images, process, in substantially real-time, the preview image to identify an object, in the preview image, that corresponds to the document, as described above in connection with FIGS. 1A-1L. In some implementations, the processing may include converting the preview image into a grayscale image, generating a blurred image based on the grayscale image, detecting a plurality of edges in the blurred image, identifying a plurality of shapes based on the plurality of edges, defining a plurality of bounding rectangles for the plurality of shapes, and determining an outline of the object based on the plurality of bounding rectangles.

As further shown in FIG. 4, process 400 may include determining, based on determining the outline of the object in one or more preview images of the plurality of preview images, whether a value of an image parameter, associated with the one or more preview images, satisfies a threshold (block 430). For example, the user device (e.g., using processor 320, memory 330, storage component 340, and/or the like) may determine, based on determining the outline of the object in one or more preview images of the plurality of preview images, whether a value of an image parameter, associated with the one or more preview images, satisfies a threshold, as described above in connection with FIGS. 1A-1L.

As further shown in FIG. 4, process 400 may include providing, in substantially real-time, feedback to a user of the user device, based on determining that the value of the image parameter does not satisfy the threshold, the feedback including an instruction to the user to perform an action with respect to the user device and/or to the document (block 440). For example, the user device (e.g., using processor 320, memory 330, storage component 340, output component 360, and/or the like) may provide, in substantially real-time, feedback to a user of the user device, based on determining that the value of the image parameter does not satisfy the threshold, as described above in connection with FIGS. 1A-1L. In some implementations, the feedback may include an instruction to the user to perform an action with respect to the user device and/or to the document.

As further shown in FIG. 4, process 400 may include automatically capturing an image of the document based on determining that the value of the image parameter satisfies the threshold (block 450). For example, the user device (e.g., using processor 320, memory 330, storage component 340, input component 350, and/or the like) may automatically capture an image of the document based on determining that the value of the image parameter satisfies the threshold, as described above in connection with FIGS. 1A-1L.

Process 400 may include additional implementations, such as any single implementation or any combination of implementations described below and/or in connection with one or more other processes described elsewhere herein.

In some implementations, process 400 may include determining, after automatically capturing the image, whether another value of the image parameter, associated with the image, satisfies the threshold. In some implementations, process 400 may include automatically capturing another image of the document after determining that the other value of the image parameter, associated with the image, does not satisfy the threshold. In some implementations, process 400 may include determining, after automatically capturing the image, whether another value of the image parameter, associated with the image, satisfies the threshold. In some implementations, process 400 may include automatically cropping an object, in the image, that corresponds to the document, after determining that the other value of the image parameter, associated with the image, satisfies the threshold.

In some implementations, process 400 may include presenting, for display, a particular preview image of the one or more preview images. In some implementations, process 400 may include overlaying, on the particular preview image, a boundary box that corresponds to the outline of the object determined for the particular preview image or determined for another preview image of the one or more preview images.

In some implementations, process 400 may include performing a filtering process to identify a particular bounding rectangle, of the plurality of bounding rectangles, that has an aspect ratio corresponding to an aspect ratio of the document. In some implementations, determining the outline of the object may include determining the outline of the object based on the particular bounding rectangle.

In some implementations, the image parameter may relate to a distance, between the user device and the document, that is represented by a ratio of a width, of the outline of the object determined for a particular preview image of the one or more preview images, to a width of a camera preview display of the user device.

In some implementations, the image parameter may relate to glare. In some implementations, the action may include positioning the user device closer to, or farther away from, the document. In some implementations, the action may include positioning the document away from a light source.

In some implementations, process 400 may include, prior to determining whether the value of the image parameter satisfies the threshold, determining whether a value of another image parameter, associated with at least one preview image of the plurality of preview images, satisfies another threshold. In some implementations, process 400 may include providing, in substantially real-time, particular feedback to the user based on determining that the value of the other image parameter does not satisfy the other threshold. In some implementations, the particular feedback may include another instruction to the user to perform another action with respect to the document.

In some implementations, the image parameter may relate to contrast. In some implementations, the action may include positioning the document onto a different surface. In some implementations, the image parameter may relate to image focus.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
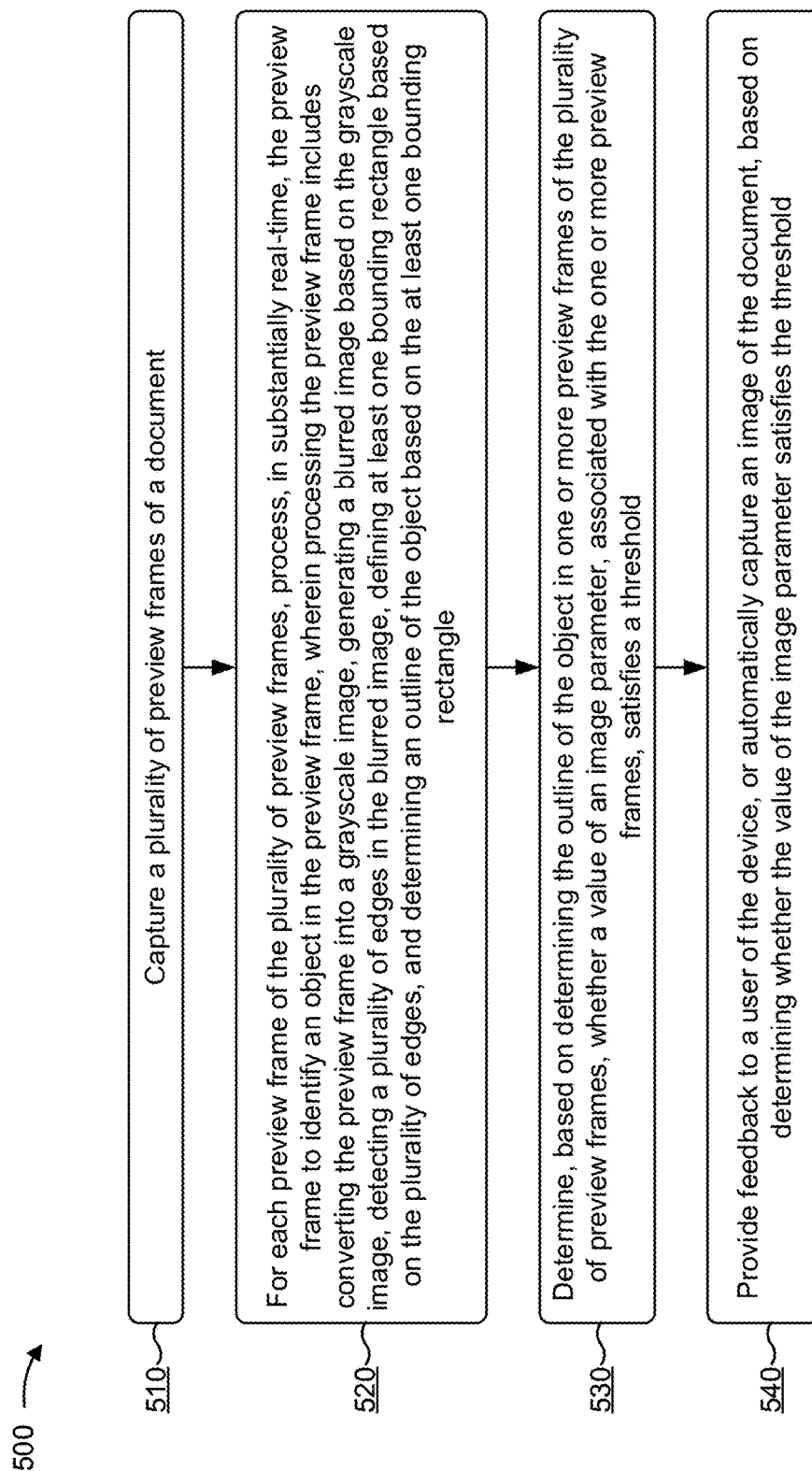
FIG. 5 is a flow chart of an example process for facilitating capturing of a high-resolution image using a real-time, or near real-time, image analysis and processing pipeline.

FIG. 5 is a flow chart of an example process 500 for facilitating capturing of a high-resolution image using a real-time, or near real-time, image analysis and processing pipeline. In some implementations, one or more process blocks of FIG. 5 may be performed by a user device (e.g., user device 210). In some implementations, one or more process blocks of FIG. 5 may be performed by another device or a group of devices separate from or including the user device, such as backend platform 215. In some implementations, the user device may include one or more memories and one or more processors, communicatively coupled to the one or more memories, configured to perform process 500.

As shown in FIG. 5, process 500 may include capturing a plurality of preview frames of a document (block 510). For example, the user device (e.g., using processor 320, memory 330, storage component 340, input component 350, and/or the like) may capture a plurality of preview frames of a document, as described above in connection with FIGS. 1A-1L.

As further shown in FIG. 5, process 500 may include, for each preview frame of the plurality of preview frames, processing, in substantially real-time, the preview frame to identify an object in the preview frame, wherein, when processing the preview frame, the one or more processors are configured to convert the preview frame into a grayscale image, generate a blurred image based on the grayscale image, detect a plurality of edges in the blurred image, define at least one bounding rectangle based on the plurality of edges, and determine an outline of the object based on the at least one bounding rectangle (block 520). For example, the user device (e.g., using processor 320, memory 330, storage component 340, and/or the like) may, for each preview frame of the plurality of preview frames, process, in substantially real-time, the preview frame to identify an object in the preview frame, as described above in connection with FIGS. 1A-1L. In some implementations, processing the preview frame may include converting the preview frame into a grayscale image, generating a blurred image based on the grayscale image, detecting a plurality of edges in the blurred image, defining at least one bounding rectangle based on the plurality of edges, and determining an outline of the object based on the at least one bounding rectangle.

As further shown in FIG. 5, process 500 may include determining, based on determining the outline of the object in one or more preview frames of the plurality of preview frames, whether a value of an image parameter, associated with the one or more preview frames, satisfies a threshold (block 530). For example, the user device (e.g., using processor 320, memory 330, storage component 340, and/or the like) may determine, based on determining the outline of the object in one or more preview frames of the plurality of preview frames, whether a value of an image parameter, associated with the one or more preview frames, satisfies a threshold, as described above in connection with FIGS. 1A-1L.

As further shown in FIG. 5, process 500 may include providing feedback to a user of the user device, or automatically capture an image of the document, based on determining whether the value of the image parameter satisfies the threshold (block 540). For example, the user device (e.g., using processor 320, memory 330, storage component 340, output component 360, and/or the like) may provide feedback to a user of the user device, or automatically capture an image of the document, based on determining whether the value of the image parameter satisfies the threshold, as described above in connection with FIGS. 1A-1L.

Process 500 may include additional implementations, such as any single implementation or any combination of implementations described below and/or in connection with one or more other processes described elsewhere herein.

In some implementations, the one or more processors, when processing the preview frame, may be configured to cause the plurality of edges to become dilated, after detecting the plurality of edges, to fill gaps between lines, and identify a plurality of shapes after causing the plurality of edges to become dilated. In some implementations, the one or more processors, when defining the at least one bounding rectangle, may be configured to define the at least one bounding rectangle based on identifying the plurality of shapes.

In some implementations, the one or more processors, when processing the preview frame, may be configured to identify contours after causing the plurality of edges to become dilated. In some implementations, the one or more processors, when identifying the plurality of shapes, may be configured to identify the plurality of shapes after identifying the contours.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
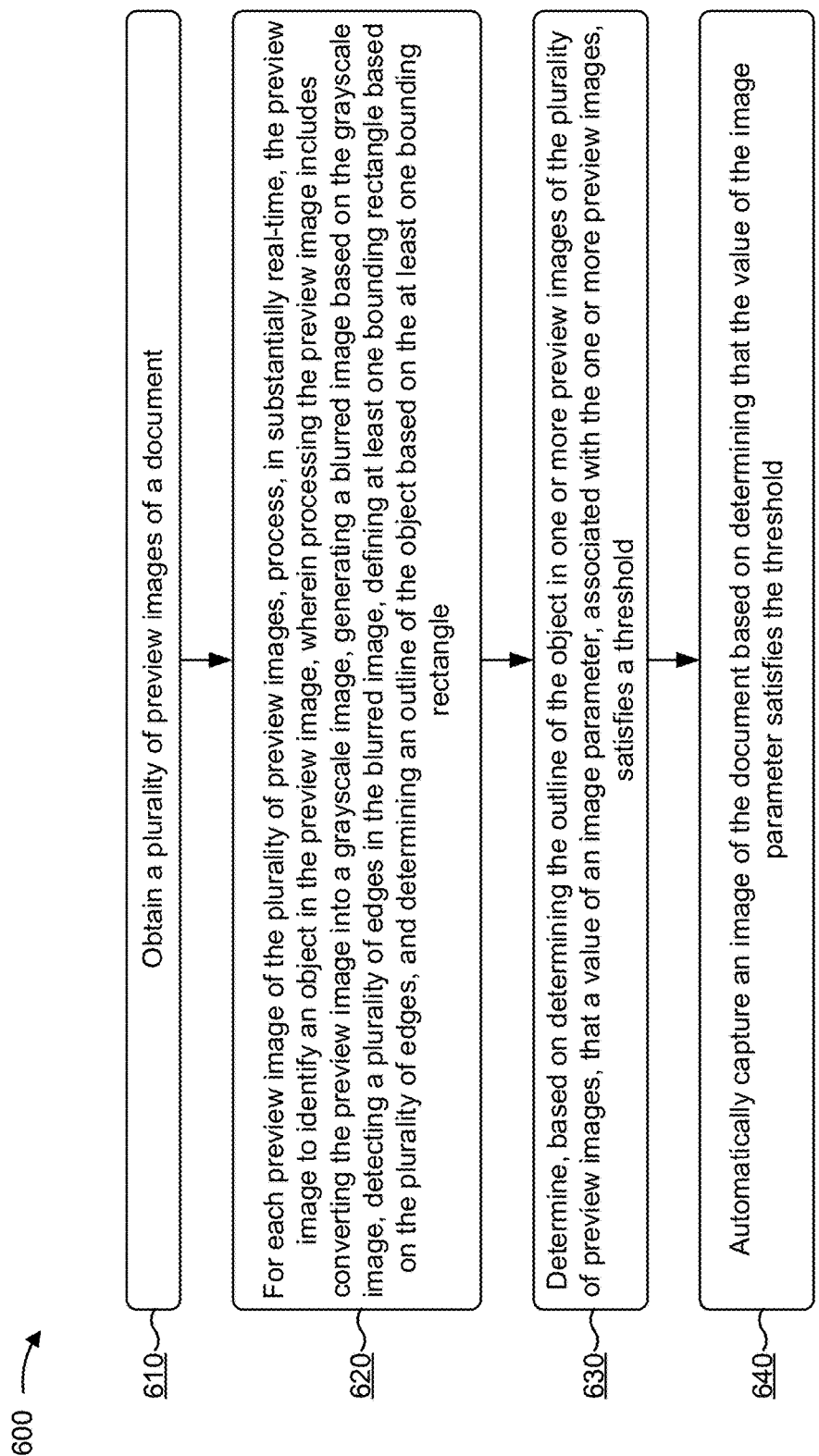
FIG. 6 is a flow chart of an example process for facilitating capturing of a high-resolution image using a real-time, or near real-time, image analysis and processing pipeline.

FIG. 6 is a flow chart of an example process 600 for facilitating capturing of a high-resolution image using a real-time, or near real-time, image analysis and processing pipeline. In some implementations, one or more process blocks of FIG. 6 may be performed by a user device (e.g., user device 210). In some implementations, one or more process blocks of FIG. 6 may be performed by another device or a group of devices separate from or including the user device, such as backend platform 215. In some implementations, a non-transitory computer-readable medium may store instructions. In some implementations, the instructions may include one or more instructions that, when executed by one or more processors of the user device, cause the one or more processors to perform process 600.

As shown in FIG. 6, process 600 may include obtaining a plurality of preview images of a document (block 610). For example, the user device (e.g., using processor 320, memory 330, storage component 340, input component 350, communication interface 370, and/or the like) may obtain a plurality of preview images of a document, as described above in connection with FIGS. 1A-1L.

As further shown in FIG. 6, process 600 may include, for each preview image of the plurality of preview images, process, in substantially real-time, the preview image to identify an object in the preview image, wherein the one or more instructions, that cause the one or more processors to process the preview image, cause the one or more processors to convert the preview image into a grayscale image, generate a blurred image based on the grayscale image, detect a plurality of edges in the blurred image, define at least one bounding rectangle based on the plurality of edges, and determine an outline of the object based on the at least one bounding rectangle (block 620). For example, the user device (e.g., using processor 320, memory 330, storage component 340, and/or the like) may, for each preview image of the plurality of preview images, process, in substantially real-time, the preview image to identify an object in the preview image, as described above in connection with FIGS. 1A-1L. In some implementations, processing the preview image may include converting the preview image into a grayscale image, generating a blurred image based on the grayscale image, detecting a plurality of edges in the blurred image, defining at least one bounding rectangle based on the plurality of edges, and determining an outline of the object based on the at least one bounding rectangle.

As shown in FIG. 6, process 600 may include determining, based on determining the outline of the object in one or more preview images of the plurality of preview images, that a value of an image parameter, associated with the one or more preview images, satisfies a threshold (block 630). For example, the user device (e.g., using processor 320, memory 330, storage component 340, and/or the like) may determine, based on determining the outline of the object in one or more preview images of the plurality of preview images, that a value of an image parameter, associated with the one or more preview images, satisfies a threshold, as described above in connection with FIGS. 1A-1L.

As shown in FIG. 6, process 600 may include automatically capturing an image of the document based on determining that the value of the image parameter satisfies the threshold (block 640). For example, the user device (e.g., using processor 320, memory 330, storage component 340, input component 350, and/or the like) may automatically capture an image of the document based on determining that the value of the image parameter satisfies the threshold, as described above in connection with FIGS. 1A-1L.

Process 600 may include additional implementations, such as any single implementation or any combination of implementations described below and/or in connection with one or more other processes described elsewhere herein.

In some implementations, the one or more instructions, that cause the one or more processors to obtain the plurality of preview images, may cause the one or more processors to obtain each preview image, of the plurality of preview images, at a first resolution. In some implementations, the one or more instructions, that cause the one or more processors to automatically capture the image, may cause the one or more processors to automatically capture the image at a second resolution that is higher than the first resolution.

In some implementations, the one or more instructions, that cause the one or more processors to process the preview image, may cause the one or more processors to process the preview image to determine a position of the object, a size of the object, and/or a rotation of the object. In some implementations, the document may include a government-issued identification card, an employee identification card, a health insurance card, or a transaction card.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
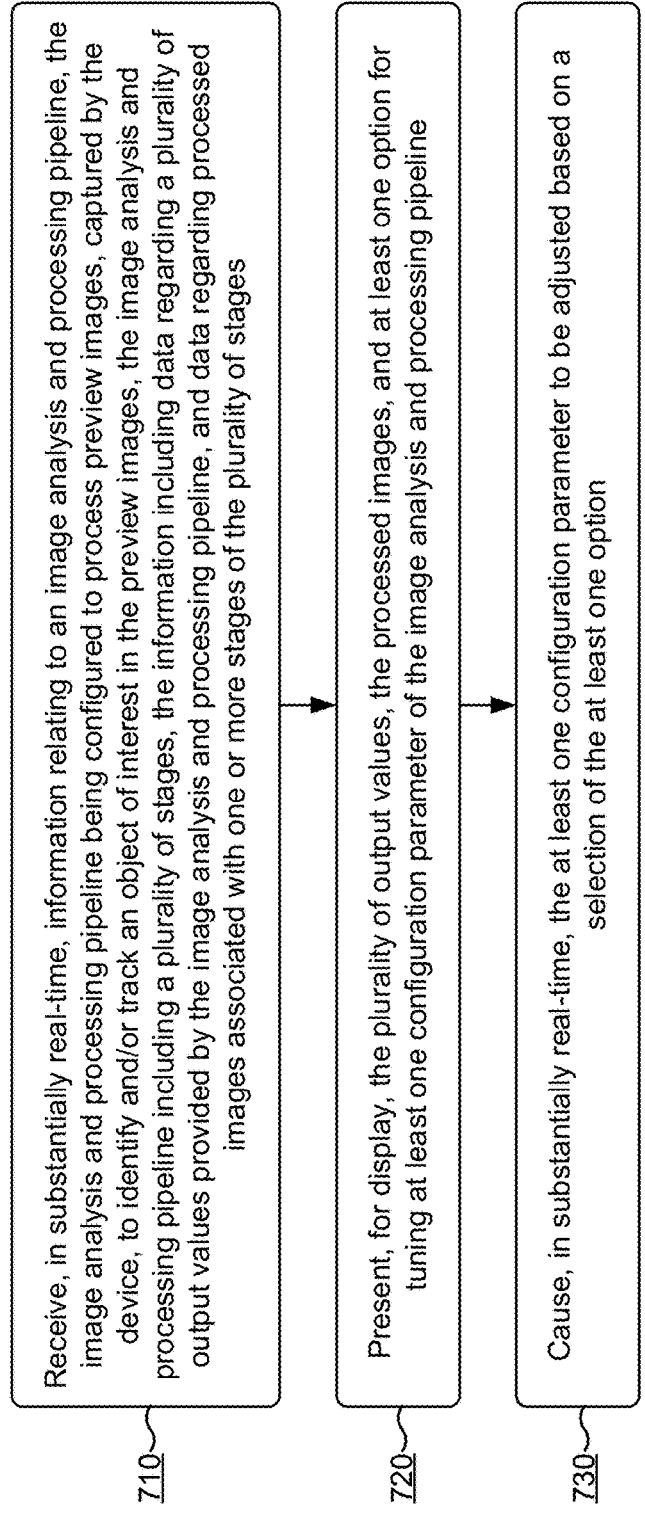
FIG. 7 is a flow chart of an example process for real-time, or near real-time, debugging and configuration of an image analysis and processing pipeline.

FIG. 7 is a flow chart of an example process 700 for real-time, or near real-time, debugging and configuration of an image analysis and processing pipeline. In some implementations, one or more process blocks of FIG. 7 may be performed by a user device (e.g., user device 210). In some implementations, one or more process blocks of FIG. 7 may be performed by another device or a group of devices separate from or including the user device, such as backend platform 215.

As shown in FIG. 7, process 700 may include receiving, in substantially real-time, information relating to an image analysis and processing pipeline, the image analysis and processing pipeline being configured to process preview images, captured by the user device, to identify and/or track an object of interest in the preview images, the image analysis and processing pipeline including a plurality of stages, the information including data regarding a plurality of output values provided by the image analysis and processing pipeline, and data regarding processed images associated with one or more stages of the plurality of stages (block 710). For example, the user device (e.g., using processor 320, memory 330, storage component 340, input component 350, communication interface 370, and/or the like) may receive, in substantially real-time, information relating to an image analysis and processing pipeline, as described above in connection with FIGS. 1A-1L. In some implementations, the image analysis and processing pipeline may be configured to process preview images, captured by the user device, to identify and/or track an object of interest in the preview images. In some implementations, the image analysis and processing pipeline may include a plurality of stages. In some implementations, the information may include data regarding a plurality of output values provided by the image analysis and processing pipeline, and data regarding processed images associated with one or more stages of the plurality of stages.

As further shown in FIG. 7, process 700 may include presenting, in substantially real-time, for display, the plurality of output values, the processed images, and at least one option for tuning at least one configuration parameter of the image analysis and processing pipeline (block 720). For example, the user device (e.g., using processor 320, memory 330, storage component 340, output component 360, and/or the like) may present, in substantially real-time, for display, the plurality of output values, the processed images, and at least one option for tuning at least one configuration parameter of the image analysis and processing pipeline, as described above in connection with FIGS. 1A-1L.

As further shown in FIG. 7, process 700 may include causing, in substantially real-time, the at least one configuration parameter to be adjusted based on a selection of the at least one option (block 730). For example, the user device (e.g., using processor 320, memory 330, storage component 340, communication interface 370, and/or the like) may cause, in substantially real-time, the at least one configuration parameter to be adjusted based on a selection of the at least one option, as described above in connection with FIGS. 1A-1L.

Process 700 may include additional implementations, such as any single implementation or any combination of implementations described below and/or in connection with one or more other processes described elsewhere herein.

In some implementations, the at least one option may include an option for tuning a configuration parameter associated with a blurring operation. In some implementations, the at least one option may include an option for tuning one or more configuration parameters associated with edge detection. In some implementations, the at least one option may include an option for tuning a configuration parameter associated with a pixel dilation operation.

In some implementations, the data regarding the plurality of output values may include data regarding whether each output value, of the plurality of output values, satisfies a corresponding threshold. In some implementations, presenting the plurality of output values for display may include presenting, for display, an output value, of the plurality of output values, in different manners depending on whether the output value satisfies the corresponding threshold.

In some implementations, presenting, for display, the output value in different manners may include presenting, for display, the output value in a first color if the output value satisfies the corresponding threshold, and presenting, for display, the output value in a second color, different than the first color, if the output value does not satisfy the corresponding threshold.

In some implementations, the information may further include data regarding an outline for the object of interest. In some implementations, process 700 may include presenting, for display as an overlay on one of the processed images, a boundary box based on the outline. In some implementations, process 700 may include presenting, for display, an option to export image data from the image analysis and processing pipeline, and causing the image data to be outputted in a certain image format based on a selection of the option.

In some implementations, process 700 may include presenting, for display, an option to reset the at least one configuration parameter to one or more default values, and causing the at least one configuration parameter to be adjusted to the one or more default values based on a selection of the option. In some implementations, process 700 may include presenting, for display, a histogram that identifies a distribution of brightness in one of the processed images.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
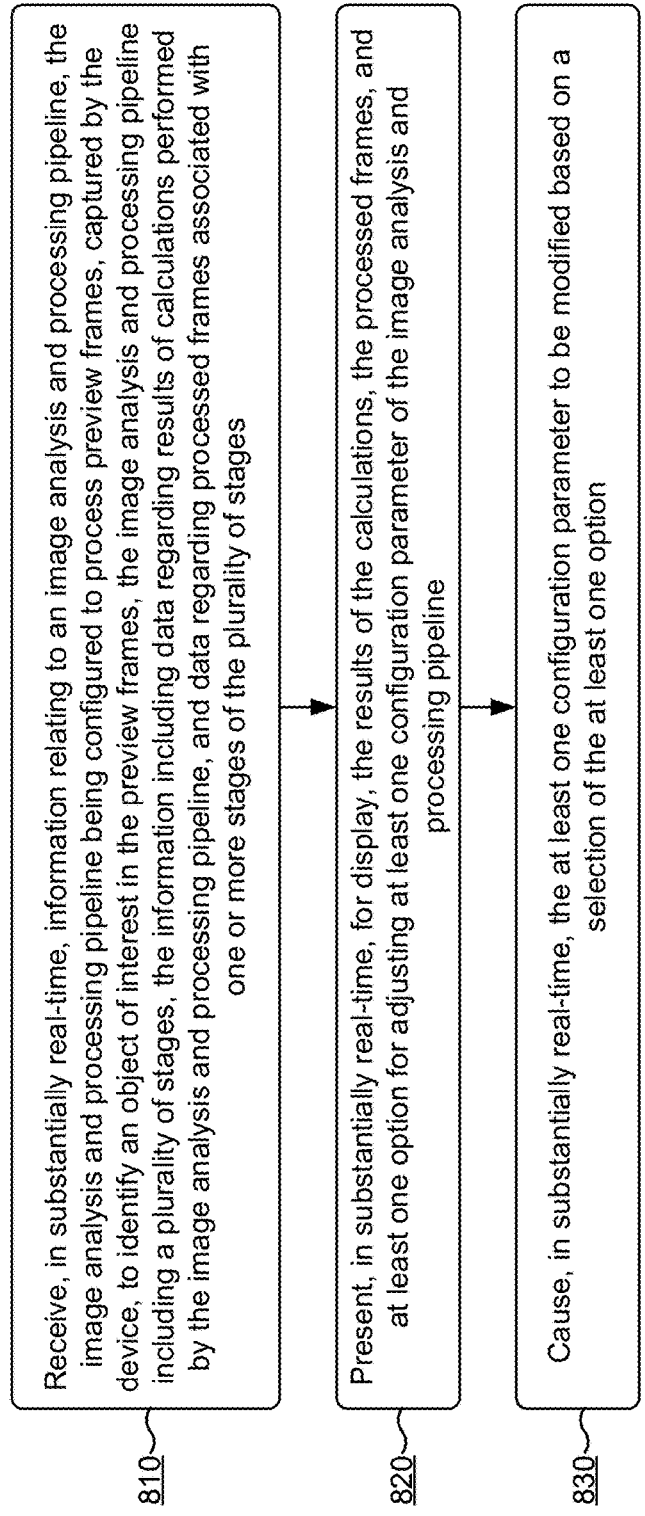
FIG. 8 is a flow chart of an example process for real-time, or near real-time, debugging and configuration of an image analysis and processing pipeline.

FIG. 8 is a flow chart of an example process 800 for real-time, or near real-time, debugging and configuration of an image analysis and processing pipeline. In some implementations, one or more process blocks of FIG. 8 may be performed by a user device (e.g., user device 210). In some implementations, one or more process blocks of FIG. 8 may be performed by another device or a group of devices separate from or including the user device, such as backend platform 215. In some implementations, the user device may include one or more memories and one or more processors, communicatively coupled to the one or more memories, configured to perform process 800.

As shown in FIG. 8, process 800 may include receiving, in substantially real-time, information relating to an image analysis and processing pipeline, the image analysis and processing pipeline being configured to process preview frames, captured by the user device, to identify an object of interest in the preview frames, the image analysis and processing pipeline including a plurality of stages, the information including data regarding results of calculations performed by the image analysis and processing pipeline, and data regarding processed frames associated with one or more stages of the plurality of stages (block 810). For example, the user device (e.g., using processor 320, memory 330, storage component 340, input component 350, communication interface 370, and/or the like) may receive, in substantially real-time, information relating to an image analysis and processing pipeline, as described above in connection with FIGS. 1A-1L. In some implementations, the image analysis and processing pipeline may be configured to process preview frames, captured by the user device, to identify an object of interest in the preview frames. In some implementations, the image analysis and processing pipeline may include a plurality of stages. In some implementations, the information may include data regarding results of calculations performed by the image analysis and processing pipeline, and data regarding processed frames associated with one or more stages of the plurality of stages.

As further shown in FIG. 8, process 800 may include presenting, in substantially real-time, for display, the results of the calculations, the processed frames, and at least one option for adjusting at least one configuration parameter of the image analysis and processing pipeline (block 820). For example, the user device (e.g., using processor 320, memory 330, storage component 340, output component 360, and/or the like) may present, in substantially real-time, for display, the results of the calculations, the processed frames, and at least one option for adjusting at least one configuration parameter of the image analysis and processing pipeline, as described above in connection with FIGS. 1A-1L.

As further shown in FIG. 8, process 800 may include causing, in substantially real-time, the at least one configuration parameter to be modified based on a selection of the at least one option (block 830). For example, the user device (e.g., using processor 320, memory 330, storage component 340, communication interface 370, and/or the like) may cause, in substantially real-time, the at least one configuration parameter to be modified based on a selection of the at least one option, as described above in connection with FIGS. 1A-1L.

Process 800 may include additional implementations, such as any single implementation or any combination of implementations described below and/or in connection with one or more other processes described elsewhere herein.

In some implementations, the one or more processors, when presenting the at least one option for display, may be configured to present the at least one option for display as a user-selectable slide bar. In some implementations, the image analysis and processing pipeline may be implemented in the user device.

In some implementations, the information may further include performance data relating to the image analysis and processing pipeline and the user device. In some implementations, the performance data may identify processing times associated with one or more stages of the plurality of stages. In some implementations, the performance data may identify a quantity of frames per unit time that the user device is capable of processing using the image analysis and processing pipeline.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
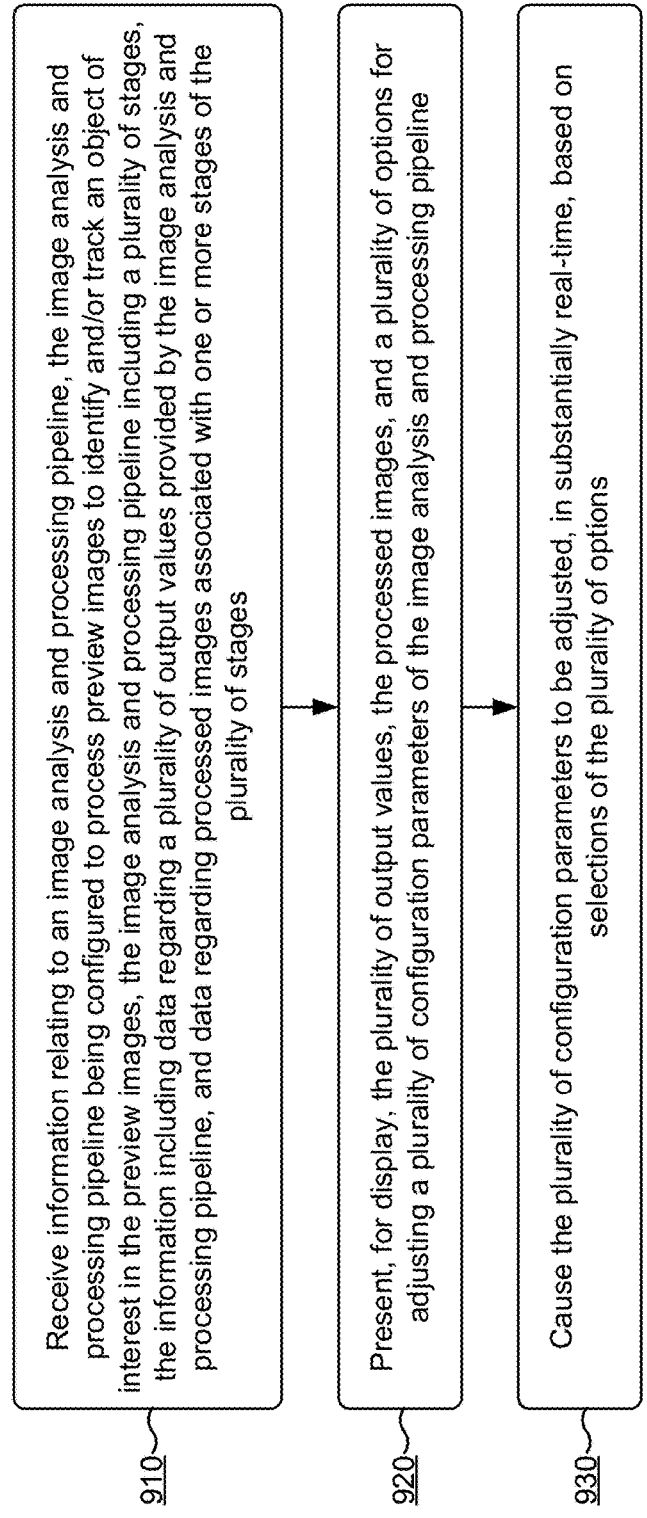
FIG. 9 is a flow chart of an example process for real-time, or near real-time, debugging and configuration of an image analysis and processing pipeline.

FIG. 9 is a flow chart of an example process 900 for real-time, or near real-time, debugging and configuration of an image analysis and processing pipeline. In some implementations, one or more process blocks of FIG. 9 may be performed by a user device (e.g., user device 210). In some implementations, one or more process blocks of FIG. 9 may be performed by another device or a group of devices separate from or including the user device, such as backend platform 215. In some implementations, a non-transitory computer-readable medium may store instructions. In some implementations, the instructions may include one or more instructions that, when executed by one or more processors of the user device, cause the one or more processors to perform process 900.

As shown in FIG. 9, process 900 may include receiving information relating to an image analysis and processing pipeline, the image analysis and processing pipeline being configured to process preview images to identify and/or track an object of interest in the preview images, the image analysis and processing pipeline including a plurality of stages, the information including data regarding a plurality of output values provided by the image analysis and processing pipeline, and data regarding processed images associated with one or more stages of the plurality of stages (block 910). For example, the user device (e.g., using processor 320, memory 330, storage component 340, input component 350, communication interface 370, and/or the like) may receive information relating to an image analysis and processing pipeline, as described above in connection with FIGS. 1A-1L. In some implementations, the image analysis and processing pipeline may be configured to process preview images to identify and/or track an object of interest in the preview images. In some implementations, the image analysis and processing pipeline may include a plurality of stages. In some implementations, the information may include data regarding a plurality of output values provided by the image analysis and processing pipeline, and data regarding processed images associated with one or more stages of the plurality of stages.

As further shown in FIG. 9, process 900 may include presenting, for display, the plurality of output values, the processed images, and a plurality of options for adjusting a plurality of configuration parameters of the image analysis and processing pipeline (block 920). For example, the user device (e.g., using processor 320, memory 330, storage component 340, output component 360, and/or the like) may present, for display, the plurality of output values, the processed images, and a plurality of options for adjusting a plurality of configuration parameters of the image analysis and processing pipeline, as described above in connection with FIGS. 1A-1L.

As further shown in FIG. 9, process 900 may include causing the plurality of configuration parameters to be adjusted, in substantially real-time, based on selections of the plurality of options (block 930). For example, the user device (e.g., using processor 320, memory 330, storage component 340, communication interface 370, and/or the like) may cause the plurality of configuration parameters to be adjusted, in substantially real-time, based on selections of the plurality of options, as described above in connection with FIGS. 1A-1L.

Process 900 may include additional implementations, such as any single implementation or any combination of implementations described below and/or in connection with one or more other processes described elsewhere herein.

In some implementations, the one or more instructions, when executed by the one or more processors, may further cause the one or more processors to present, for display, a preview image captured by the user device. In some implementations, the information may further include data regarding motion stability of the user device. In some implementations, the one or more instructions, when executed by the one or more processors, may further cause the one or more processors to present, for display, an indicator identifying the motion stability of the user device. In some implementations, the plurality of output values may relate to at least two of contrast, glare, focus, and distance of the user device relative to a document.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

In this way, the image analysis and processing pipeline may guide a user in the image capturing process via real-time (or near real-time) feedback, and ensure that only high-quality images of a document are ultimately captured (and, for example, uploaded to a backend platform for validation). This shortens, and simplifies, the image capturing process, which conserves computing resources, power resources, and memory resources of the device that would otherwise need to be expended in cases where low-quality images are repeatedly captured. In addition, this conserves computing resources, memory resources, and network resources, associated with a backend platform, that would otherwise need to be expended to receive and process such low-quality images.

In addition, implementations of the visualization and configuration system, described herein, permit efficient testing of the image analysis and processing pipeline. Inefficiencies in the image analysis and processing pipeline may be identified and corrected, and optimal configuration parameters may also be determined. Furthermore, permitting a user to observe the progression of image processing, at various stages of the image analysis and processing pipeline, is particularly beneficial, since small adjustments to the configuration parameters, at a given stage, may have a large impact on an end result. For example, a user may, based on observations gained from the visualization and configuration system, develop automated test(s) for continuously validating the image analysis and processing pipeline (e.g., by adjusting inputs and observing corresponding outputs of the image analysis and processing pipeline). This simplifies the development process, and conserves computing resources and power resources that would otherwise need to be expended as part of typical debug sessions. Moreover, implementing the visualization and configuration system in the same device, on which the image analysis and processing pipeline is executing, also enables a user to freely test the image analysis and processing pipeline, without a need to connect the user device to an external computing device (as may otherwise be needed for debug purposes), which also simplifies the development process, and conserves computing resources and power resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method, comprising:
    processing, by a device, a preview frame to identify an outline of an object,
        wherein processing the preview frame comprises:
            dilating highlighted pixels, and
            identifying contours in the highlighted pixels;
    determining, by the device and based on processing the preview frame, whether a first value of an image parameter, associated with the preview frame, satisfies a first threshold;
    determining, by the device, whether a second value satisfies a second threshold,
        the second value being associated with one or more of:
            a distance between the object and the device, or
            contrast associated with the preview frame;
    selectively providing, by the device, feedback based on determining that the first value does not satisfy the first threshold or that the second value does not satisfy the second threshold;
    automatically capturing, by the device, an image of the object based on determining that the first value satisfies the first threshold and the second value satisfies the second threshold; and
    performing, by the device, a post-capture analysis of the image to determine whether a third value, associated with a parameter of the image, satisfies a third threshold.

2. The method of claim 1, further comprising:
    determining whether to capture another image of the object based on determining that the third value does not satisfy the third threshold.

3. The method of claim 1, further comprising:
    providing the image to another device for validation based on a result of the post-capture analysis.

4. The method of claim 1, wherein performing the post-capture analysis of the image comprises:
    identifying the object in the image; and
    performing the post-capture analysis on only the object.

5. The method of claim 1, further comprising:
    cropping the object from the image based on determining that the third value satisfies the third threshold.

6. The method of claim 1, further comprising:
    providing information associated with the post-capture analysis to another device for image data analytics.

7. The method of claim 1, wherein the feedback is provided in real-time.

8. A device, comprising:
    one or more memories; and
    one or more processors, coupled to the one or more memories, configured to:
        process a preview frame to identify an outline of an object,
            wherein the one or more processors, to process the preview frame, are configured to:
                dilate highlighted pixels, and
                identify contours in the highlighted pixels;
        determine, based on processing the preview frame, whether a first value of an image parameter, associated with the preview frame, satisfies a first threshold;
        determine whether a second value satisfies a second threshold,
            the second value being associated with one or more of:
                a distance between the object and the device, or
                contrast associated with the preview frame;

selectively provide feedback based on determining that the first value does not satisfy the first threshold or that the second value does not satisfy the second threshold;

automatically capture an image of the object based on determining that the first value satisfies the first threshold and the second value satisfies the second threshold; and perform a post-capture analysis of the image to determine whether a third value, associated with a parameter of the image, satisfies a third threshold.

9. The device of claim 8, wherein the object is a document.

10. The device of claim 8, wherein the one or more processors, to identify the outline of the object, are configured to:

identify a bounding rectangle that has an aspect ratio that corresponds to an aspect ratio of a particular type of document.

11. The device of claim 8, wherein the one or more processors, to identify the outline of the object, are configured to:

identify a bounding rectangle that has a size that corresponds to a size of a particular type of document.

12. The device of claim 8, wherein the one or more processors are further configured to:

determine that the outline of the object corresponds to a document.

13. The device of claim 8, wherein the one or more processors, to process the preview frame to identify the outline of the object, are configured to:

process the preview frame in real-time to identify the outline of the object.

14. The device of claim 8, wherein the one or more processors are further configured to:

determine that the outline of the object has been successfully determined; and cause a boundary box to be provided, for display, as an overlay.

15. A non-transitory computer-readable medium storing a set of instructions, the set of instructions comprising:

one or more instructions that, when executed by one or more processors of a device, cause the device to:

process a preview frame to identify an outline of an object, wherein the one or more instructions, to cause the device to process the preview frame, cause the device to:

dilate highlighted pixels, and identify contours in the highlighted pixels;

determine, based on processing the preview frame, whether a first value of an image parameter, associated with the preview frame, satisfies a first threshold;

determine whether a second value satisfies a second threshold, the second value being associated with one or more of:

a distance between the object and the device, or contrast associated with the preview frame;

selectively provide feedback based on determining that the first value does not satisfy the first threshold or that the second value does not satisfy the second threshold;

automatically capture an image of the object based on determining that the first value satisfies the first threshold and the second value satisfies the second threshold; and perform a post-capture analysis of the image to determine whether a third value, associated with a parameter of the image, satisfies a third threshold.

16. The non-transitory computer-readable medium of claim 15, wherein the one or more instructions further cause the device to:

apply a filter only to pixels within the outline of the object.

17. The non-transitory computer-readable medium of claim 15, wherein the one or more instructions, to cause the device to provide the feedback, cause the device to:

determine an optimal size of the outline based on one or more of an aspect ratio or a size of a type of document;

provide, for display, a boundary box associated with the optimal size; and provide the feedback, wherein the feedback is associated with aligning the object with the boundary box.

18. The non-transitory computer-readable medium of claim 15, wherein the one or more instructions further cause the device to:

determine to capture another image of the object based on determining that the third value does not satisfy the third threshold.

19. The non-transitory computer-readable medium of claim 15, wherein the one or more instructions further cause the device to:

crop the object from the image based on determining that the third value satisfies the third threshold.

20. The non-transitory computer-readable medium of claim 15, wherein the one or more instructions, to cause the device to perform the post-capture analysis of the object, cause the device to:

perform the post-capture analysis on only pixels associated with the object within the image.

\* \* \* \* \*